US012687432B2

(12) United States Patent
Yeh et al.

(10) Patent No.: US 12,687,432 B2
(45) Date of Patent: Jul. 21, 2026

(54) MULTI-APPLICATION OPTICAL SENSING APPARATUS AND METHOD THEREOF

(71) Applicant: Artilux, Inc., Menlo Park, CA (US)

(72) Inventors: Chih-Wei Yeh, Hsinchu County (TW); Hung-Chih Chang, Hsinchu County (TW); Yun-Chung Na, San Jose, CA (US); Tsung-Ting Wu, Hsinchu County (TW); Shu-Lu Chen, Hsinchu County (TW)

(73) Assignee: Artilux, Inc., Menlo Park, CA (US)

( * ) Notice: Subject to any disclaimer, the term of this patent is extended or adjusted under 35 U.S.C. 154(b) by 119 days.

(21) Appl. No.: 18/652,501

(22) Filed: May 1, 2024

(65) Prior Publication Data

US 2024/0280407 A1 Aug. 22, 2024

Related U.S. Application Data

(63) Continuation of application No. 18/179,117, filed on Mar. 6, 2023, now Pat. No. 12,007,280, which is a
(Continued)

(51) Int. Cl.
*G01J 3/50* (2006.01)
*G01B 11/24* (2006.01)
(Continued)

(52) U.S. Cl.
CPC ............... *G01J 3/50* (2013.01); *G01B 11/24* (2013.01); *G01J 3/0208* (2013.01); *G01J 3/51* (2013.01); *H04N 25/53* (2023.01); *H04N 25/702* (2023.01)

(58) Field of Classification Search
CPC . G01B 11/24; G01J 3/0208; G01J 3/50; G01J 3/51; H04N 25/00; H04N 25/53;
(Continued)

(56) References Cited

U.S. PATENT DOCUMENTS

| 10,728,462 B2 | 7/2020 | Wang |
| 10,782,236 B2 | 9/2020 | Borthakur et al. |

(Continued)

FOREIGN PATENT DOCUMENTS

| CN | 108028258 A | 5/2018 |
| CN | 110870070 A | 3/2020 |

(Continued)

OTHER PUBLICATIONS

Extended European Search Report for Application No. EP21203741.0, mailed Mar. 28, 2022, 22 pages.
(Continued)

*Primary Examiner* — Hina F Ayub
(74) *Attorney, Agent, or Firm* — Dority & Manning, P.A.

(57) ABSTRACT

Systems, apparatuses, and methods for multi-application optical sensing are provided. For example, an optical sensing apparatus can include a photodetector array, a first circuitry, and a second circuitry. The photodetector array includes a plurality of photodetectors, wherein a first subset of the plurality of photodetectors are configured as a first region for detecting a first optical signal, and a second subset of the plurality of photodetectors are configured as a second region for detecting a second optical signal. The first circuitry, coupled to the first region, is configured to perform a first function based on the first optical signal to output a first output result. The second circuitry, coupled to the second region, is configured to perform a second function based on the second optical signal to output a second output result.

20 Claims, 20 Drawing Sheets

Related U.S. Application Data continuation of application No. 17/470,728, filed on Sep. 9, 2021, now Pat. No. 11,624,653.

(60) Provisional application No. 63/226,761, filed on Jul. 29, 2021, provisional application No. 63/223,056, filed on Jul. 18, 2021, provisional application No. 63/192,105, filed on May 24, 2021, provisional application No. 63/165,715, filed on Mar. 24, 2021, provisional application No. 63/144,459, filed on Feb. 1, 2021, provisional application No. 63/120,726, filed on Dec. 3, 2020.

(51) Int. Cl.

| | |
|---|---|
| *G01J 3/02* | (2006.01) |
| *G01J 3/51* | (2006.01) |
| *H04N 25/53* | (2023.01) |
| *H04N 25/702* | (2023.01) |

(58) Field of Classification Search
CPC .. H04N 25/702; H04N 25/705; H04N 25/706; H04N 25/707
See application file for complete search history.

(56) References Cited

U.S. PATENT DOCUMENTS

| | | |
|---|---|---|
| 2005/0001281 A1 | 1/2005 | Hsu et al. |
| 2008/0012083 A1 | 1/2008 | Gilton |
| 2008/0174670 A1 | 7/2008 | Olsen et al. |
| 2010/0019154 A1 | 1/2010 | Rafferty et al. |
| 2011/0249148 A1 | 10/2011 | Prescher et al. |
| 2013/0132038 A1 | 5/2013 | Regan et al. |
| 2013/0321679 A1 | 12/2013 | Lim et al. |
| 2013/0335725 A1 | 12/2013 | Hardegger et al. |
| 2014/0009648 A1 | 1/2014 | Kim et al. |
| 2014/0267849 A1 | 9/2014 | Geelen et al. |
| 2015/0022869 A1 | 1/2015 | Shi et al. |
| 2015/0054962 A1 | 2/2015 | Borthakur et al. |
| 2015/0069218 A1 | 3/2015 | Cho et al. |
| 2016/0190197 A1 | 6/2016 | Blanquart |
| 2017/0077168 A1 | 3/2017 | Wan |
| 2017/0084044 A1 | 3/2017 | Keh et al. |
| 2018/0213205 A1 | 7/2018 | Oh |
| 2018/0233521 A1 | 8/2018 | Na et al. |
| 2019/0094361 A1 | 3/2019 | Onal et al. |
| 2019/0214420 A1 | 7/2019 | Kim et al. |
| 2019/0324147 A1 | 10/2019 | Day et al. |
| 2020/0041626 A1 | 2/2020 | Yoshino et al. |
| 2020/0052016 A1 | 2/2020 | Na et al. |
| 2020/0116836 A1* | 4/2020 | Pacala ................... G01J 3/0224 |
| 2020/0169669 A1 | 5/2020 | Petkov et al. |
| 2020/0286260 A1 | 9/2020 | Chen et al. |
| 2021/0003830 A1 | 1/2021 | Koehler |

FOREIGN PATENT DOCUMENTS

| | | |
|---|---|---|
| EP | 3525451 | 8/2019 |
| WO | WO 2020/054282 | 3/2020 |
| WO | WO 2020/070554 | 4/2020 |

OTHER PUBLICATIONS

Extended European Search Report for European Application 26155388.7, dated Apr. 29, 2026. 14 pages.

* cited by examiner

100B

200A

200B

400A

400B

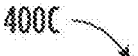
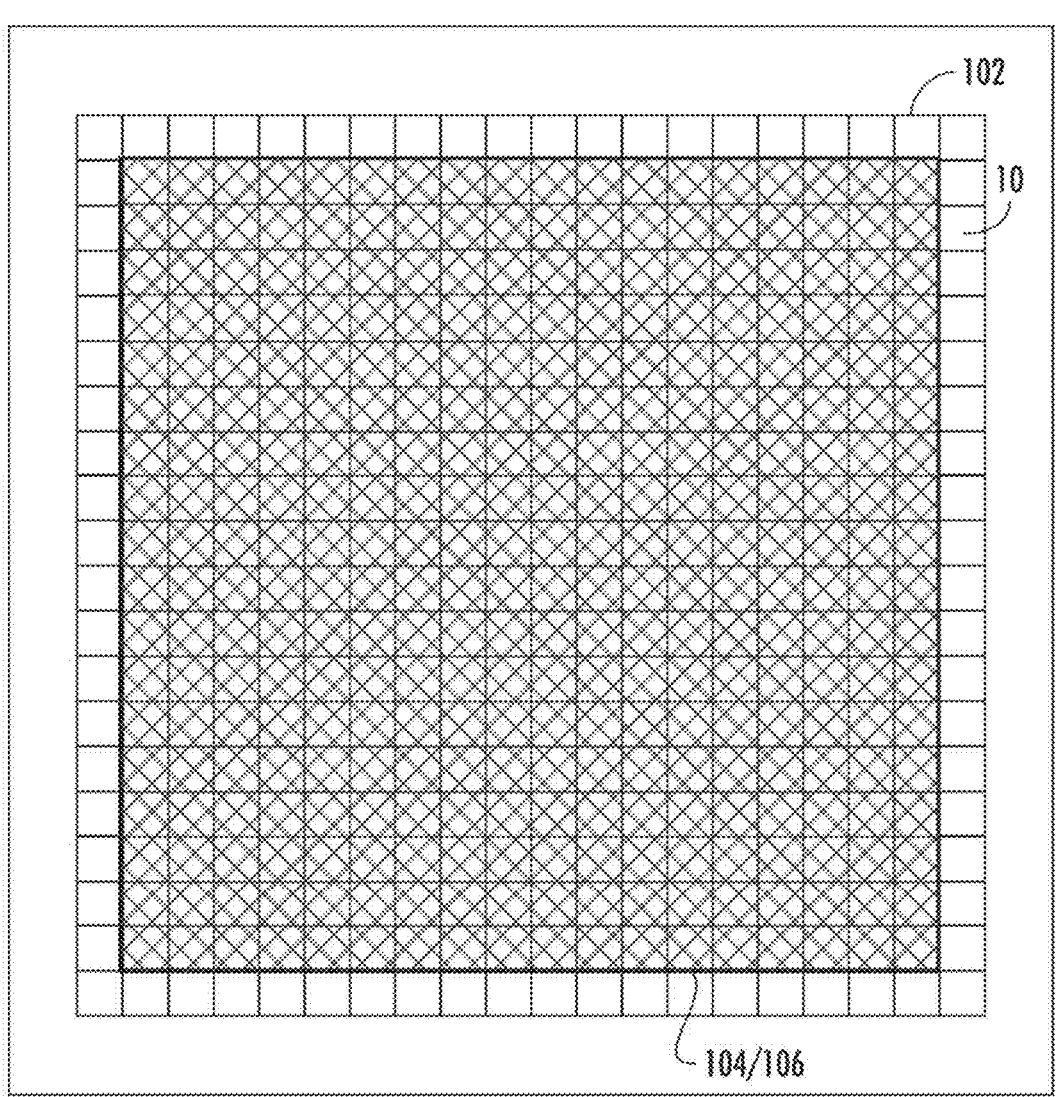
FIG. 4C 104      105

106      107

102

10

SWITCHING CIRCUIT — 109

FIRST CIRCUITRY — 108

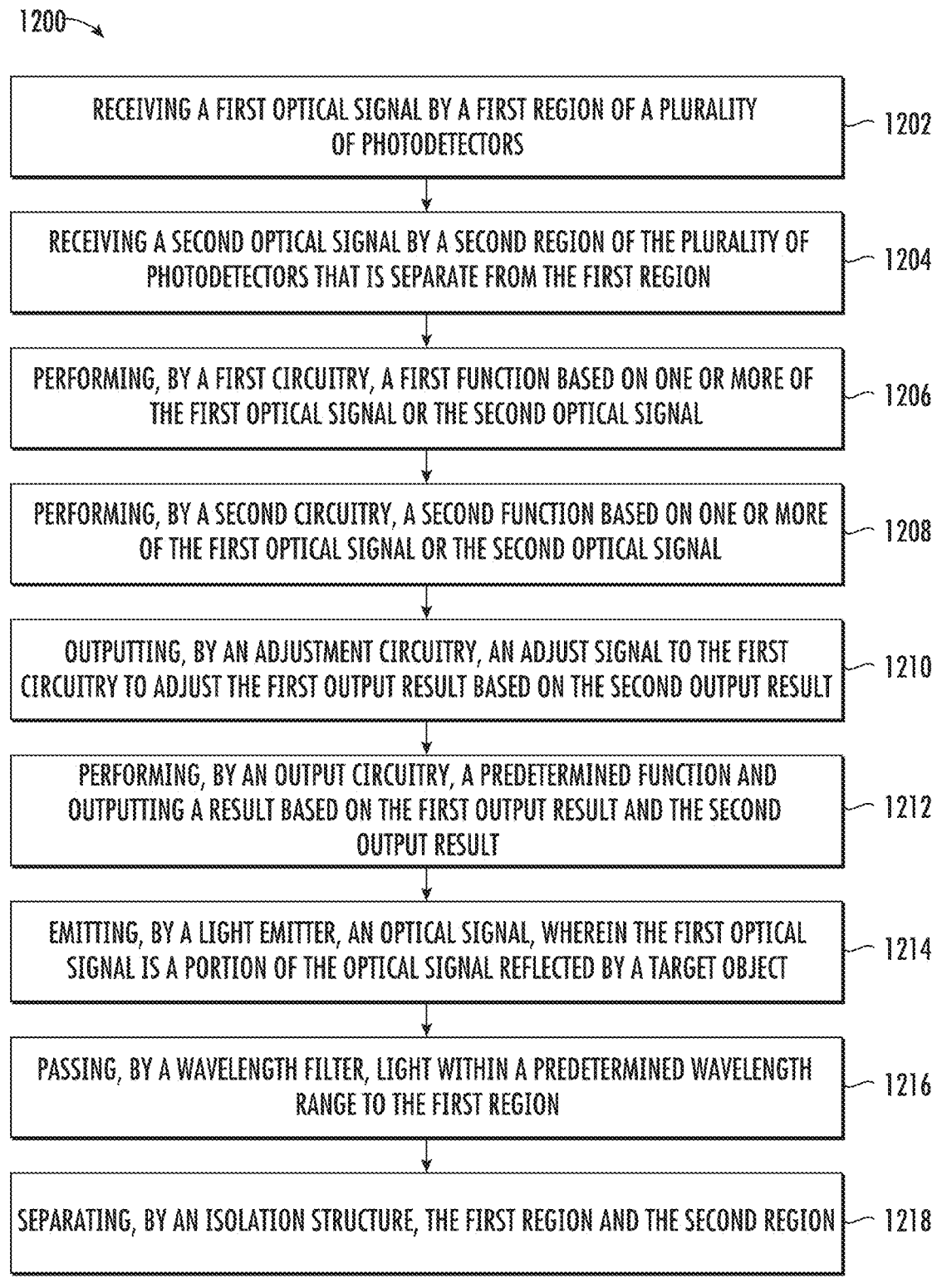

1200

RECEIVING A FIRST OPTICAL SIGNAL BY A FIRST REGION OF A PLURALITY OF PHOTODETECTORS — 1202

RECEIVING A SECOND OPTICAL SIGNAL BY A SECOND REGION OF THE PLURALITY OF PHOTODETECTORS THAT IS SEPARATE FROM THE FIRST REGION — 1204

PERFORMING, BY A FIRST CIRCUITRY, A FIRST FUNCTION BASED ON ONE OR MORE OF THE FIRST OPTICAL SIGNAL OR THE SECOND OPTICAL SIGNAL — 1206

PERFORMING, BY A SECOND CIRCUITRY, A SECOND FUNCTION BASED ON ONE OR MORE OF THE FIRST OPTICAL SIGNAL OR THE SECOND OPTICAL SIGNAL — 1208

OUTPUTTING, BY AN ADJUSTMENT CIRCUITRY, AN ADJUST SIGNAL TO THE FIRST CIRCUITRY TO ADJUST THE FIRST OUTPUT RESULT BASED ON THE SECOND OUTPUT RESULT — 1210

PERFORMING, BY AN OUTPUT CIRCUITRY, A PREDETERMINED FUNCTION AND OUTPUTTING A RESULT BASED ON THE FIRST OUTPUT RESULT AND THE SECOND OUTPUT RESULT — 1212

EMITTING, BY A LIGHT EMITTER, AN OPTICAL SIGNAL, WHEREIN THE FIRST OPTICAL SIGNAL IS A PORTION OF THE OPTICAL SIGNAL REFLECTED BY A TARGET OBJECT — 1214

PASSING, BY A WAVELENGTH FILTER, LIGHT WITHIN A PREDETERMINED WAVELENGTH RANGE TO THE FIRST REGION — 1216

SEPARATING, BY AN ISOLATION STRUCTURE, THE FIRST REGION AND THE SECOND REGION — 1218

FIG. 12

MULTI-APPLICATION OPTICAL SENSING APPARATUS AND METHOD THEREOF

RELATED APPLICATIONS

The present application is a continuation of U.S. application Ser. No. 18/179,117 having a filing date of Mar. 6, 2023, which is a continuation of U.S. application Ser. No. 17/470,728 having a filing date of Sep. 9, 2021, which claims filing benefit of U.S. Provisional Patent Application Ser. No. 63/120,726, having a filing date of Dec. 3, 2020, U.S. Provisional Patent Application Ser. No. 63/144,459, having a filing date of Feb. 1, 2021, U.S. Provisional Patent Application Ser. No. 63/165,715, having a filing date of Mar. 24, 2021, U.S. Provisional Patent Application Ser. No. 63/192,105, having a filing date of May 24, 2021, U.S. Provisional Patent Application Ser. No. 63/223,056, having a filing date of Jul. 18, 2021, and U.S. Provisional Patent Application Ser. No. 63/226,761, having a filing date of Jul. 29, 2021, each of which is incorporated herein by reference in its entirety.

FIELD

The present disclosure relates generally to sensor systems. In particular, the present disclosure provides a multi-application optical sensing apparatus and related method.

BACKGROUND

Sensors are being used in many applications, such as smartphones, robotics, and autonomous vehicles, etc. to determine characteristics (e.g., object recognition, object classification, depth information, edge detection, motion information, image enhancement, material recognition, color fusion, etc.) of objects in an environment and to implement other applications. When developing a sensor, however, some problems or issues may need to be solved, such as how to optimize photodetector arrays for multiple potential purposes and/or applications.

SUMMARY

Aspects and advantages of embodiments of the present disclosure will be set forth in part in the following description, or may be learned from the description, or may be learned through practice of the embodiments.

One example aspect of the present disclosure is directed to an optical sensing apparatus. The optical sensing apparatus can include a photodetector array, a first circuitry, and a second circuitry. The photodetector array includes a plurality of photodetectors, wherein a first subset of the plurality of photodetectors are configured as a first region for detecting a first optical signal, and a second subset of the plurality of photodetectors are configured as a second region for detecting a second optical signal. The first circuitry, coupled to the first region, is configured to perform a first function based on the first optical signal to output a first output result. The second circuitry, coupled to the second region, is configured to perform a second function based on the second optical signal to output a second output result.

In some implementations, the optical sensing apparatus includes an adjustment circuitry, coupled to the first circuitry and the second circuitry, that is configured to output, based on the second output result, an adjust signal to the first circuitry to adjust the first output result.

In some implementations, the optical sensing apparatus includes an output circuitry, coupled to the first circuitry and the second circuitry, that is configured to perform a predetermined function and output a third result based on the first output result and the second output result.

In some implementations, the optical sensing apparatus includes a light emitter configured to emit an optical signal, wherein the first optical signal is a portion of the optical signal reflected by a target object.

In some implementations, the first function is a color or a grey sensing function and the second function is a dynamic visual sensing function.

In some implementations, the first function is a 3D sensing function, and the second function is a color sensing function or a dynamic visual sensing function.

In some implementations, the first function is a color sensing function or a grey sensing function, the second function is a short-wavelength infrared (SWIR) sensing function, and the predetermined function is a material recognition function that determines one or more characteristics of a material.

In some implementations, the first function is a 3D sensing function, the second function is a color sensing function, and the predetermined function is a depth color fusion function that determines a colored 3D image.

In some implementations, the first function is a 3D sensing function for the first optical signal with a first wavelength, the second function is a 3D sensing function for the second optical signal with a second wavelength, and the predetermined function is a material recognition function that determines one or more characteristics of a material.

In some implementations, the optical sensing apparatus includes a wavelength filter arranged to pass light within a predetermined wavelength range to the first region.

In some implementations, a frame rate of the 3D sensing function is adjusted based on the adjust signal.

In some implementations, the adjustment circuitry is implemented by an application specific integrated circuit (ASIC), digital signal processing (DSP) processor, general-purpose processor, or any combination thereof.

In some implementations, the output circuitry is implemented by an application specific integrated circuit (ASIC), digital signal processing (DSP) processor, general-purpose processor, or any combination thereof.

In some implementations, the optical sensing apparatus includes an isolation structure separating the first region and the second region.

In some implementations, the photodetector array is formed on a first die, wherein the first circuitry and the second circuitry are formed on a second die, and wherein the first die is bonded to the second die.

In some implementations, the first output result represents an image, and the adjustment circuitry is configured to adjust a dynamic range or an exposure time of the image.

In some implementations, the first subset of the plurality of photodetectors are germanium photodetectors formed on a silicon substrate, and the second subset of the plurality of photodetectors are silicon photodetectors formed on a silicon substrate.

In some implementations, the optical sensing apparatus includes a first filter for the first subset of the plurality of photodetectors and a second filter for the second subset of the plurality of photodetectors.

In some implementations, the optical sensing apparatus includes a first set of microlens arrays for focusing light to the first subset of the plurality of photodetectors and a second set of microlens arrays for focusing light to the second subset of the plurality of photodetectors.

Another example aspect of the present disclosure is directed to an optical sensing method. The method includes receiving a first optical signal by a first region of a plurality of photodetectors. The method also includes receiving a second optical signal by a second region the plurality of photodetectors that is separate from the first region. The method also includes performing, by a first circuitry, a first function based on the first optical signal detected by the first region to output a first output result. The method also includes performing, by a second circuitry, a second function based on the second optical signal detected by the second region to output a second output result.

In some implementations, the method also includes outputting, by an adjustment circuitry, an adjust signal to the first circuitry to adjust the first output result based on second output result.

In some implementations, the method also includes performing, by an output circuitry, a predetermined function and outputting an output result based on the first output result and the second output result.

In some implementations, the method also includes emitting, by a light emitter, an optical signal, wherein the first optical signal is a portion of the optical signal reflected by a target object.

In some implementations, the first function is a color or a grey sensing function and the second function is a dynamic visual sensing function.

In some implementations, the first function is a 3D sensing function, and the second function is a color sensing function or a dynamic visual sensing function.

In some implementations, the first function is a color sensing function or a grey sensing function, the second function is a short-wavelength infrared (SWIR) sensing function, and the predetermined function is a material recognition function that determines one or more characteristics of a material.

In some implementations, the first function is a 3D sensing function, the second function is a color sensing function, and the predetermined function is a depth color fusion function that determines a colored 3D image.

In some implementations, the first function is a 3D sensing function for the first optical signal with a first wavelength, the second function is a 3D sensing function for the second optical signal with a second wavelength, and the predetermined function is a material recognition function that determines one or more characteristics of a material.

In some implementations, the method includes passing, by a wavelength filter, light within a predetermined wavelength range to the first region.

In some implementations, a frame rate of the 3D sensing function is adjusted based on the adjust signal.

In some implementations, the adjustment circuitry is implemented by an application specific integrated circuit (ASIC), digital signal processing (DSP) processor, general-purpose processor, or any combination thereof.

In some implementations, the output circuitry is implemented by an application specific integrated circuit (ASIC), digital signal processing (DSP) processor, general-purpose processor, or any combination thereof.

In some implementations, the method includes separating, by an isolation structure, the first region and the second region.

Another example aspect of the present disclosure is directed to an optical sensing apparatus that includes a substrate; one or more pixels supported by the substrate, where each of the pixel comprises an absorption region supported by the substrate, and where the absorption region configured to receive an optical signal and generate photo-carriers in response to receiving the optical signal; one or more lenses over the respective pixel of the one or more pixels, where the one or more lenses are composed of a first material having a first refractive index; and an encapsulation layer over the one or more lenses and composed of a second material having a second refractive index between 1.3 to 1.8, where a difference between the first refractive index and the second refractive index is above an index threshold such that a difference between an effective focal length of the one or more lenses and a distance between the one or more lenses and the one or more pixels is within a distance threshold.

In some implementations, the first refractive index of the one or more lenses is not less than 3, where the difference between the first refractive index and the second refractive index of the encapsulation layer is not less than 0.5.

In some implementations, the optical sensing apparatus can include a first planarization layer between the encapsulation layer and the one or more lenses, where the first planarization layer is composed of a third material having a third refractive index that is within a threshold from the second refractive index.

In some implementations, the optical sensing apparatus can include a first anti-reflection layer between the one or more lenses and the first planarization layer, where the first anti-reflection layer is composed of a fourth material having a fourth refractive index between the third refractive index of the first planarization layer and the first refractive index of the one or more lenses.

In some implementations, the optical sensing apparatus can include a filter layer between the first planarization layer and the encapsulation layer, where the filter layer is configured to pass optical signal having a specific wavelength range.

In some implementations, the optical sensing apparatus can include a second planarization layer between the one or more lenses and the substrate.

In some implementations, the first planarization layer or the second planarization layer is composed of a material comprising polymer having a refractive index between 1 and 2.

In some implementations, the optical sensing apparatus can include a second anti-reflection layer between the first planarization layer and the encapsulation layer, where the second anti-reflection layer is composed of a sixth material having a sixth refractive index between the second refractive index of the encapsulation layer and the third refractive index of the first planarization layer.

In some implementations, the optical sensing apparatus can include a filter layer between the one or more lenses and the one or more pixels, where the filter layer is configured to pass optical signal having a specific wavelength range.

In some implementations, the optical sensing apparatus can include a second planarization layer between the filter layer and the substrate.

In some implementations, the optical sensing apparatus can include a carrier substrate and an integrated circuit layer between the one or more pixels and the carrier substrate, where the integrated circuit layer includes a control circuit configured to control the one or more pixels.

In some implementations, the substrate is composed of a material comprising silicon. In some implementations, the absorption region is composed of a material comprising germanium.

Another example aspect of the present disclosure is directed to an optical sensing apparatus that includes a substrate; one or more pixels supported by the substrate, where each of the pixel comprises an absorption region supported by the substrate, and where the absorption region is configured to receive an optical signal and generate photo-carriers in response to receiving the optical signal; one or more lenses over the respective pixel of the one or more pixels, where the one or more lenses are composed of a first material having a first refractive index; an encapsulation layer over the one or more lenses and composed of a second material having a second refractive index lower than the first refractive index; and a first planarization layer between the encapsulation layer and the one or more lenses and composed of a third material having a third refractive index that is within a threshold from the second refractive index.

In some implementations, the optical sensing apparatus can further include a first anti-reflection layer between the one or more lenses and the encapsulation layer, where the first anti-reflection layer is composed of a fourth material having a fourth refractive index between the third refractive index of the first planarization layer and the first refractive index of the one or more lenses.

In some implementations, the optical sensing apparatus can further include a filter layer between the first planarization layer and the encapsulation layer, where the filter layer is configured to pass optical signal having a specific wavelength range.

In some implementations, the optical sensing apparatus can further include a second planarization layer between the one or more lenses and the substrate. In some implementations, the first planarization layer or the second planarization layer is composed of a material comprising polymer having a refractive index between 1 and 2.

In some implementations, the optical sensing apparatus can further include a second anti-reflection layer between the first planarization layer and the encapsulation layer, where the second anti-reflection layer is composed of a sixth material having a sixth refractive index between the second refractive index of the encapsulation layer and the third refractive index of the first planarization layer.

In some implementations, the optical sensing apparatus can further include a filter layer between the one or more lenses and the one or more pixels, where the filter layer is configured to pass optical signal having a specific wavelength range.

In some implementations, the optical sensing apparatus can further include a second planarization layer between the filter layer and the substrate.

In some implementations, the optical sensing apparatus can further include a carrier substrate and an integrated circuit layer between the one or more pixels and the carrier substrate, where the integrated circuit layer comprises a control circuit configured to control the one or more pixels.

In some implementations, the first refractive index of the one or more lenses is not less than 3. In some implementations, a difference between the first refractive index of the one or more lenses and the second refractive index of the encapsulation layer is not less than 0.5. In some implementations, a difference between the third refractive index of the first planarization layer and the first refractive index of the one or more lenses is not less than 0.5.

In some implementations, the absorption regions of the one or more pixels are at least partially embedded in a substrate. In some implementations, the one or more pixels are multiple pixels arranged in one-dimensional and two-dimensional.

Another example aspect of the present disclosure is directed to an optical sensing apparatus that includes a substrate; one or more pixels supported by the substrate, where each of the pixel comprises an absorption region supported by the substrate, and where the absorption region is configured to receive an optical signal and generate photo-carriers in response to receiving the optical signal; one or more lenses over the respective pixel of the one or more pixels, where the one or more lenses are composed of a first material having a first refractive index; a first planarization layer over the one or more lenses and composed of a second material having a second refractive index, where a difference between the second refractive index and the first refractive index is not less than 0.5.

Another example aspect of the present disclosure is directed to an optical sensing apparatus that includes a substrate; one or more pixels supported by the substrate, where each of the pixel comprises an absorption region supported by the substrate, and where the absorption region is configured to receive an optical signal and generate photo-carriers in response to receiving the optical signal; one or more lenses over the respective pixel of the one or more pixels, where the one or more lenses are composed of a first material having a first refractive index; a layer directly formed over the one or more lenses and composed of a second material having a second refractive index, where a difference between the second refractive index and the first refractive index is not less than 0.5.

Another example aspect of the present disclosure is directed to an optical sensing apparatus that includes a photodetector. The photodetector includes a first substrate comprising a first material; an absorption region formed on or at least partially in the first substrate, where the absorption region comprises a second material, and where the absorption region is configured to receive an optical signal and to generate a photo-current in response to receiving the optical signal; a second substrate bonded to the first substrate, where the second substrate comprises the first material; and first circuitry formed in the second substrate, where the first circuitry is configured to convert the photo-current and to an analog voltage output for processing; and a third substrate coupled to the photodetector, where the third substrate comprising second circuitry configured to process the analog voltage output to generate a digital output.

In some implementations, the absorption region comprises an array of pixels. In some implementations, the array of pixels are electrically coupled together to generate the photo-current. In some implementations, the first material comprises silicon, and wherein the second material comprises germanium.

In some implementations, the optical sensing apparatus can include a lens array configured to focus the optical signal to the array of pixels.

In some implementations, the first circuitry comprises a low-noise preamplifier configured to convert the photo-current and to a voltage output. In some implementations, the first circuitry further comprises an amplifier configured to amplify the voltage output. In some implementations, the second circuitry further comprises an analog-to-digital converter configured to convert the amplified voltage output to a digital signal. In some implementations, the second circuitry further comprises a micro-controller configured to process the digital signal.

In some implementations, the second substrate is bonded to the third substrate, the second substrate is arranged between the first substrate and the third substrate, and the first substrate is arranged to receive the optical signal. In some implementations, the third substrate is wire-bonded to the first substrate or the second substrate.

In some implementations, the optical sensing apparatus can include a light emitter coupled to the third substrate. In some implementations, the first circuitry further comprises driver circuitry for a light emitter.

In some implementations, one of more operating characteristics of the first circuitry is dependent on the absorption region, and one of more operating characteristics of the second circuitry is independent of the absorption region.

In some implementations, the digital output is used for proximity sensing, imaging, or time-of-flight sensing.

Another example aspect of the present disclosure is directed to an optical sensing apparatus that includes a first substrate comprising a first material; an absorption region formed on or at least partially in the first substrate, where the absorption region comprises a second material, and where the absorption region is configured to receive an optical signal and to generate a photo-current in response to receiving the optical signal; a second substrate bonded to the first substrate, where the second substrate comprises the first material; and first circuitry formed in the second substrate, where the first circuitry is configured to convert the photo-current and to an analog voltage output for processing.

In some implementations, the optical sensing apparatus can include a third substrate comprising second circuitry configured to process the analog voltage output to generate a digital output, where the second substrate is bonded to the third substrate, where the second substrate is arranged between the first substrate and the third substrate, and where the first substrate is arranged to receive the optical signal.

In some implementations, one of more operating characteristics of the first circuitry is dependent on the absorption region, and one of more operating characteristics of the second circuitry is independent of the absorption region.

In some implementations, the first circuitry further comprises driver circuitry for a light emitter.

Another example aspect of the present disclosure is directed to an optical sensing apparatus that includes a photodetector. The photodetector includes a first substrate comprising a first material; a pixel array having multiple pixels formed on or at least partially in the first substrate, where the pixel array comprises a second material, where the pixel array is configured to receive an optical signal and to generate a photo-current in response to receiving the optical signal, and where the multiple pixels of the array of pixels are electrically coupled together to generate the photo-current; a second substrate bonded to the first substrate, where the second substrate comprises the first material; and first circuitry formed in the second substrate, where the first circuitry is configured to convert the photo-current and to an analog voltage output for processing; and a third substrate coupled to the photodetector, where the third substrate comprising second circuitry is configured to process the analog voltage output to generate a digital output.

Other example aspects of the present disclosure are directed to systems, methods, apparatuses, sensors, computing devices, tangible non-transitory computer-readable media, and memory devices related to the described technology.

These and other features, aspects and advantages of various embodiments will become better understood with reference to the following description and appended claims.

The accompanying drawings, which are incorporated in and constitute a part of this specification, illustrate embodiments of the present disclosure, and together with the description, serve to explain the related principles.

BRIEF DESCRIPTION OF THE DRAWINGS

The foregoing aspects and many of the attendant advantages of this application will become more readily appreciated by reference to the following detailed description, when taken in conjunction with the accompanying drawings, wherein:

FIG. 4C illustrates exemplary embodiments of an optical sensing apparatus;

FIG. 12 illustrates a flow chart of an example process according to example aspects of the present disclosure.

DETAILED DESCRIPTION

Example aspects of the present disclosure are directed to improved systems, methods, and apparatuses for providing multi-application optical sensing. More particularly, the present disclosure provides an optical sensing apparatus that supports multiple applications for multiple wavelength ranges, including visible (e.g., wavelength range 380 nm to 780 nm, or a similar wavelength range as defined by a particular application), near-infrared (NIR, e.g., wavelength range from 780 nm to 1400 nm, or a similar wavelength range as defined by a particular application) and short-wavelength infrared (SWIR, e.g., wavelength range from 1400 nm to 3000 nm, or a similar wavelength range as defined by a particular application) wavelength ranges.

The systems and methods of the present disclosure provide a variety of technical effects and benefits. For instance, the technology of the present disclosure improves the ability to re-configure/customize a photodetector array based on its intended use. The improved optical sensing methods and apparatuses can be implemented in a variety of configurations to help improve the customization of an optical sensor for use with multiple applications. For instance, a single optical sensor or combination of optical sensors in a single device can often be used for a variety of different applications. Sensor segmentation into different regions and/or with associated processing circuitry can help to advantageously expand the potential applications of a single sensor or set of sensors across many different arenas. Additionally or alternatively, sensor use in different manners can provide a broader spectrum of available imaging, thus improving quality of information to make complex determinations in applications such as facial recognition, material sensing, object recognition, object classification, depth information, edge detection, motion information, image enhancement, material recognition, color fusion, and others.

With reference to the figures, example embodiments of the present disclosure will be discussed in further detail. It should be understood that embodiments, features, hardware, software, and/or other elements described with respect to one figure can be utilized within the systems and processes of another figure.

Figure 1A:
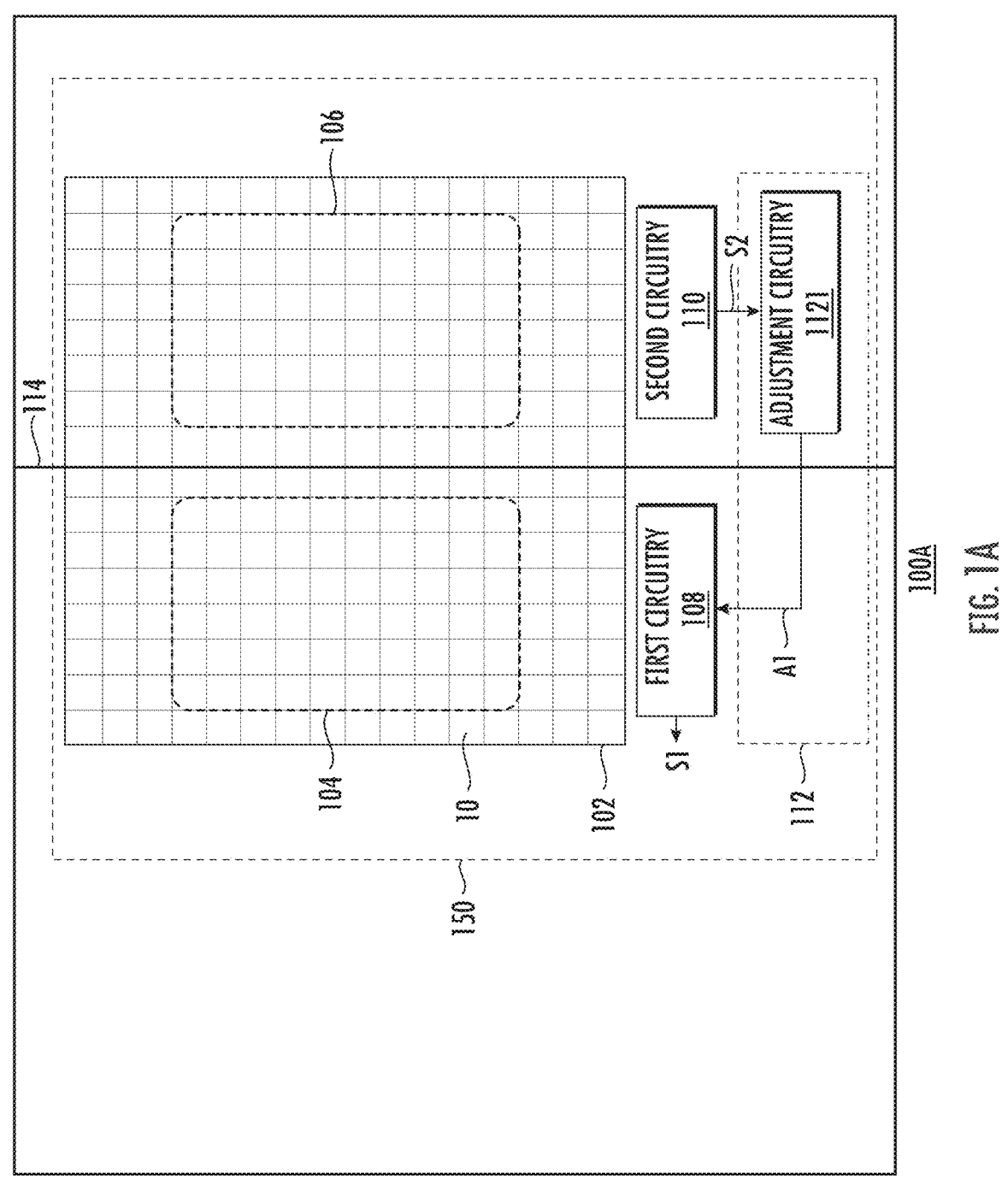
FIG. 1A illustrates exemplary embodiments of an optical sensing apparatus.

FIG. 1A illustrates exemplary embodiments of an optical sensing apparatus 100A. The optical sensing apparatus 100A includes a photodetector array 102 comprising a plurality of photodetectors 10, where each photodetector is configured to perform optical sensing. For supporting multiple applications, the photodetector array 102 can be partitioned into two or more regions. In one embodiment, as illustrated in FIG. 1A, a first subset of the plurality of photodetectors 10 are grouped as a first region 104 for detecting a first optical signal, and a second subset of the plurality of photodetectors 10 are grouped as a second region 106 for detecting a second optical signal. The optical sensing apparatus 100A includes a first circuitry 108, coupled (e.g., electrically coupled) to the first region 104, configured to perform a first function based on the first optical signal to output a first output result S1. The optical sensing apparatus 100A further includes a second circuitry 110, coupled to the second region 106, configured to perform a second function based on the second optical signal to output a second output result S2.

Furthermore, the optical sensing apparatus 100A may include a processing circuitry 112 coupled to the first circuitry 108 and the second circuitry 110, configured to perform an operation based on the first output result S1 and/or second output result S2.

In one embodiment, the processing circuitry 112 includes an adjustment circuitry 1121, coupled to the first circuitry 108 and the second circuitry 110, configured to output, based on the second output result S2, an adjust signal A1 to the first circuitry 108 to adjust the first output result S1.

As one example, the first circuitry 108 may perform a color or a grey sensing function to output the first output result S1 (e.g., a color or a grey image), and the second circuitry 110 may perform dynamic visual sensing (hereinafter "DVS") function to output the second output result S2 (e.g., a motion image). Assuming the first output result S1 is a color or a grey image and the second output result is a motion image, the adjustment circuitry 1121 can output the adjust signal A1 to dynamically adjust the color or the grey image based on the motion image. For example, the adjustment circuitry 1121 can adjust a dynamic range or an exposure time of the color or the grey image based on the motion image. With this configuration, the second circuitry 110 can be used as an auxiliary circuitry providing an additional information to the first circuitry 108 such that the color image or the grey image generated by the first circuitry 108 can be improved.

Figure 1B:
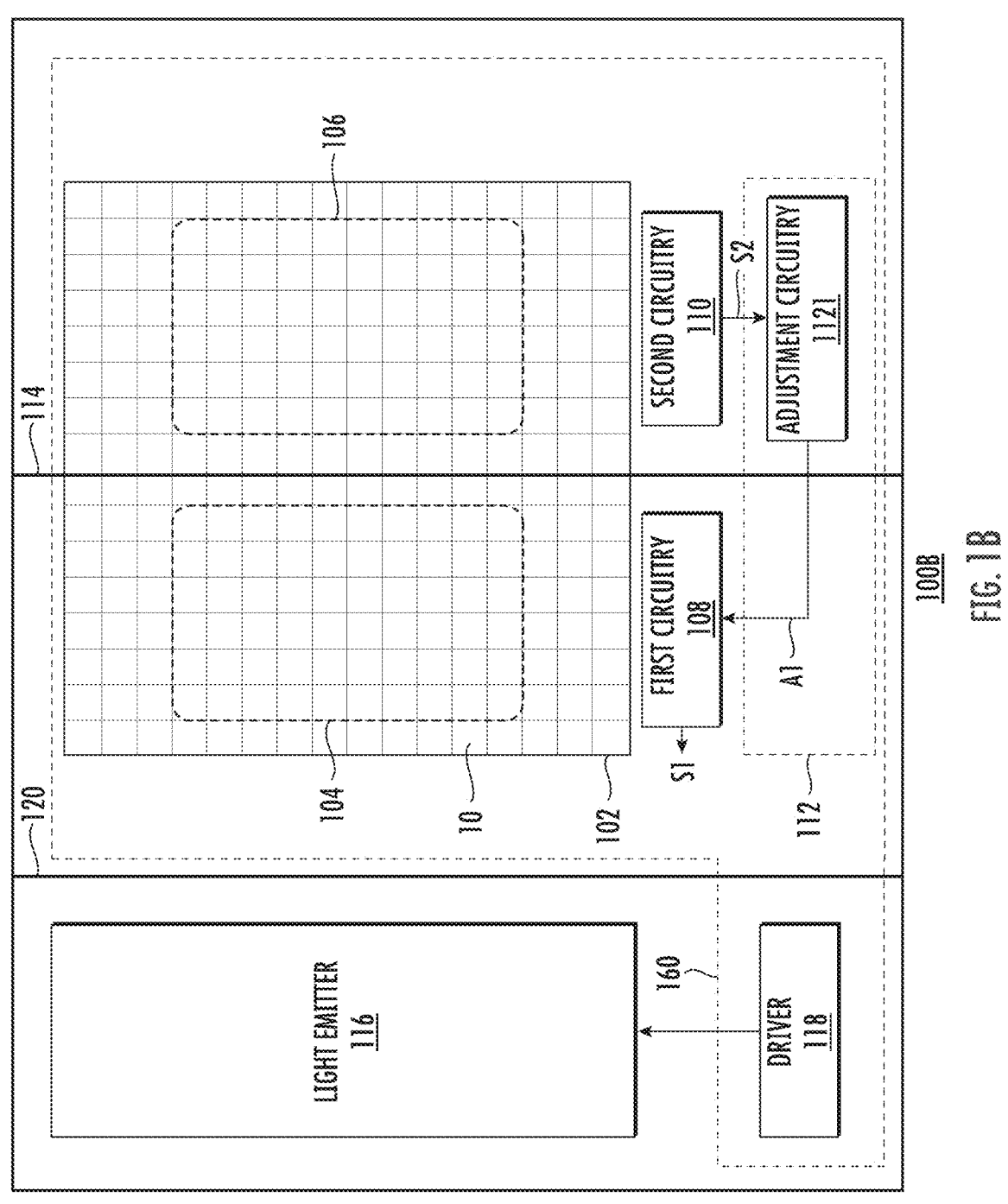
FIG. 1B illustrates exemplary embodiments of an optical sensing apparatus.

FIG. 1B illustrates exemplary embodiments of an optical sensing apparatus 100B. Compared with optical sensing apparatus 100A, the optical sensing apparatus 100B further includes a light emitter 116 and a driver 118. The light emitter 116 may include one or more light sources (e.g., edge-emitting laser, vertical-cavity surface-emitting laser (VCSEL), light emitting diode (LED), etc.), where each light source is configured to emit an optical signal to a target object (e.g., human face or any other object). As an example, the light emitter 116 may emit an optical signal at a specific wavelength such that a reflected optical signal can be detected by the first subset of the plurality of photodetectors 10 in the first region 104. In other words, the reflected optical signal can be the first optical signal detected by the first subset of the plurality of photodetectors 10 in the first region 104. The driver 118 is configured to generate a driving signal to the light emitter 116 to generate the optical signal. In some implementations, the light emitter 116 may include multiple light sources, where each light source may emit an optical signal at a different wavelength (e.g., a visible wavelength, an NIR wavelength, or a SWIR wavelength, or a combination thereof, etc.). In some embodiments, the driver 118 can be controlled by the processing circuitry 112. For example, the driver 118 can be controlled by the processing circuitry 112 to disable the light emitter 116 based on an optical measurement performed by the optical sensing apparatus 100B.

As an example, the first circuitry 108 may perform a 3D sensing function (e.g., Time-of-Flight sensing) to output the first output result S1 (e.g., a 3D image), and the second circuitry 110 may perform DVS function to output the second output result S2 (e.g., a motion image). Assuming the first output result S1 is a 3D image and the second output result is a motion image, the adjustment circuitry 1121 can output the adjust signal A1 to dynamically adjust the 3D image based on the motion image. For example, the adjustment circuitry 1121 can adjust a frame rate of the 3D image based on the motion image. In general, the frame rate of the motion image may be more than 1000 fps and the frame of the 3D image may be ranged from 30-60 fps. The adjustment circuitry 1121 can utilize the motion image to enhance the frame rate of the 3D image to be higher than 60 fps. With this configuration, the second circuitry 110 can be used as an auxiliary circuitry providing an additional information to the first circuitry 108 such that the frame rate of the 3D image can be enhanced.

Figure 2A:
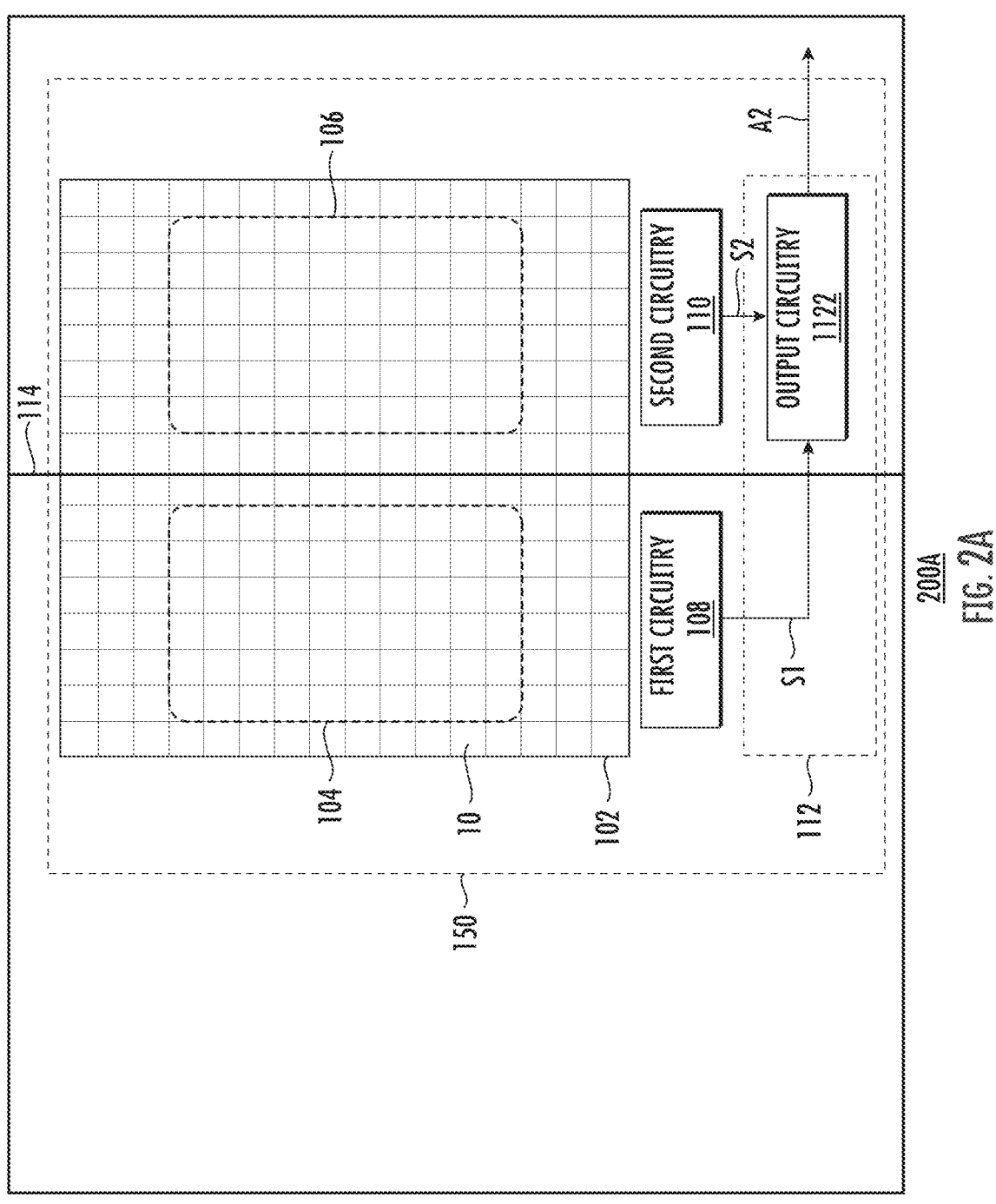
FIG. 2A illustrates exemplary embodiments of an optical sensing apparatus.

FIG. 2A illustrates exemplary embodiments of an optical sensing apparatus 200A. Compared with optical sensing apparatuses 100A and 100B, the processing circuitry 112 uses an output circuitry 1122 performing a predetermined function to output an output result A2 based on the first output result S1 and the second output result S2.

As an example, the first circuitry 108 may perform a color or a grey sensing function to output the first output result S1 (e.g., a color or a grey image) and the second circuitry 110 may perform short-wavelength infrared (hereinafter "SWIR") sensing function to output the second output result S2 (e.g., a SWIR image). Assuming the first output result S1 is a color or a grey image and the second output result is a SWIR image, the output circuitry 1122 can output the output result A2 based on the color or the grey image and the SWIR image. For example, the output circuitry 1122 can perform material recognition function that determines one or more characteristics of a material based on the color or the grey image and the SWIR image. In particular, the output circuitry 1122 utilizes the difference between the color/grey image and the SWIR image to determine one or more characteristics of the material.

Figure 2B:
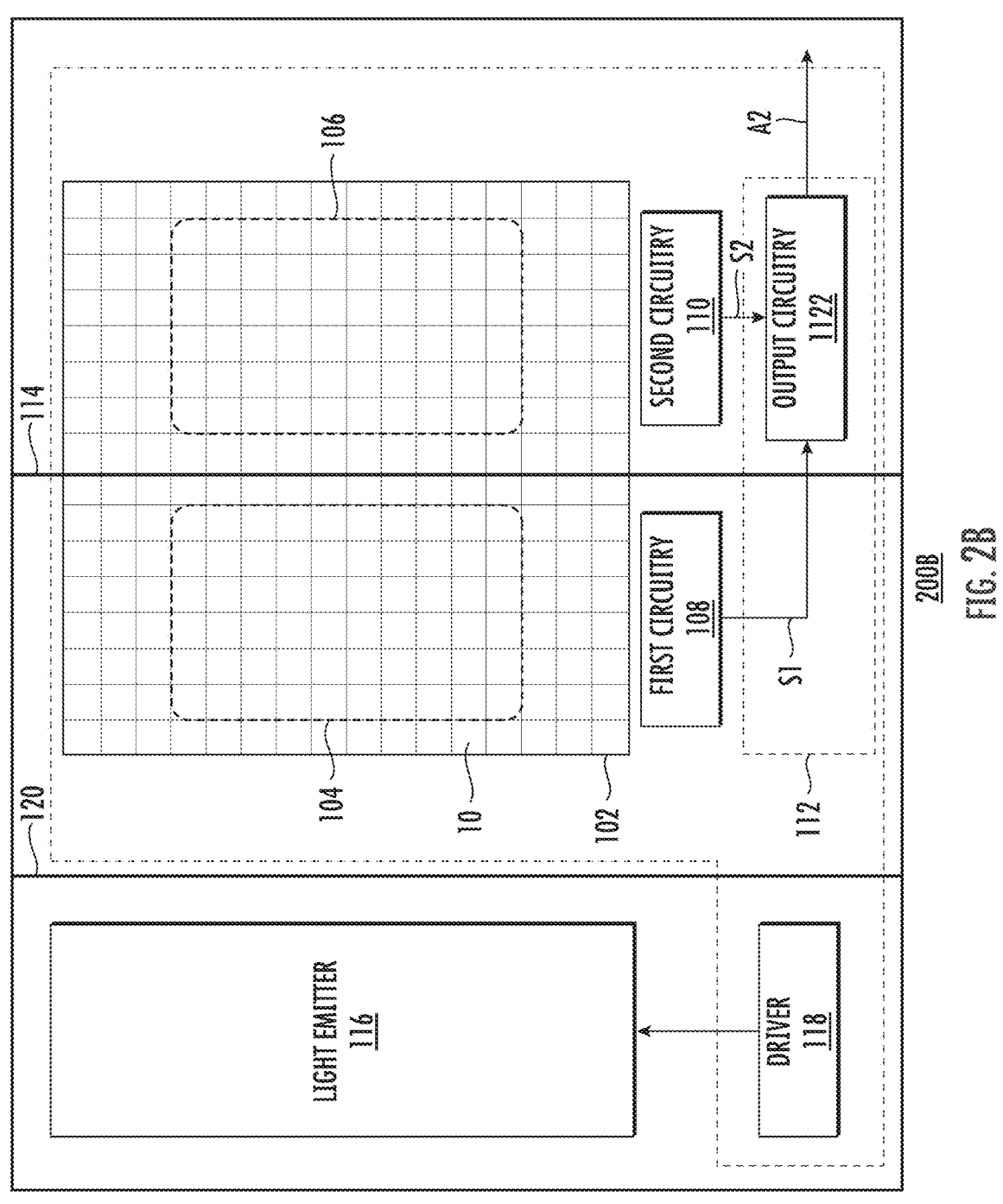
FIG. 2B illustrates exemplary embodiments of an optical sensing apparatus.

FIG. 2B illustrates exemplary embodiments of an optical sensing apparatus 200B. Compared with optical sensing apparatus 200A, the optical sensing apparatus 200B further includes the light emitter 116 and the driver 118.

As an example, the first circuitry 108 may perform a 3D sensing function (e.g., Time-of-Flight sensing) to output the first output result S1 (e.g., a 3D image) and the second circuitry 110 may perform color sensing function to output the second output result S2 (e.g., a color image). Assuming the first output result S1 is a 3D image and the second output result is a color image, the output circuitry 1122 can perform a depth color fusion function to output a colored 3D image as the output result A2.

As another example, the first circuitry 108 may perform a 3D sensing function (e.g., Time-of-Flight sensing) for the first optical signal with a first wavelength (e.g., 940 nm) detected by the first subset of the plurality of photodetectors 10 in the first region 104 to output the first output result S1 (e.g., a 3D image), and the second circuitry 110 may also perform a 3D sensing function (e.g., Time-of-Flight sensing) for the second optical signal with a second wavelength (e.g., 1350 nm) detected by the second subset of the plurality of photodetectors 10 in the second region 106 to output the second output result S2 (e.g., a 3D image). Assuming the first output result S1 is a 3D image generated based on the first optical signal with first wavelength (e.g., 940 nm) and the second output result S2 is a 3D image generated based on the second optical signal with second wavelength (e.g., 1350 nm), the output circuitry 1122 can perform a material recognition function that determines one or more characteristics of a material based on the first output result S1 and the second output result S2.

In connection with the optical sensing apparatuses 100A-200B disclosed herein, some other embodiments can be implemented as shown below.

In some embodiments, the processing circuitry 112, the adjustment circuitry 1121 and/or the output circuitry 1122 can be implemented by application specific integrated circuit (ASIC), digital signal processing (DSP) processor, general-purpose processor, or any combination thereof.

In some embodiments, the processing circuitry 112 may not be a part of the optical sensing apparatus 100A/100B/200A/200B. Instead, the output results S1 and S2 are coupled to another computing device or circuitry for further processing.

In some embodiments, the processing circuitry 112 can be coupled to the first circuitry 108, the second circuitry 110 and driver 118.

In some embodiments, the light emitter 116 can be implemented by one or more laser diodes or light-emitting diodes (LED).

In some embodiments, the first subset of the plurality of photodetectors 10 in the first region 104 and/or the second subset of the plurality of photodetectors 10 in the second region 106 may comprise a light-absorption material including germanium, where the light-absorption material is formed on a silicon substrate.

In some embodiments, the first subset of the plurality of photodetectors 10 in the first region 104 and/or the second subset of the plurality of photodetectors 10 in the second region 106 may comprise a light-absorption material including III-VI material, where the light-absorption material is formed on a silicon substrate.

In some embodiments, the first subset of the plurality of photodetectors 10 in the first region 104 may comprise a first light-absorption material, and the second subset of the plurality of photodetectors 10 in the second region 106 may comprise a second light-absorption material. As an example, the first subset of the plurality of photodetectors 10 in the first region 104 may be formed using germanium on a silicon substrate, and the second subset of the plurality of photodetectors 10 in the second region 106 may be formed using the silicon substrate. Generally, germanium (or silicon-germanium compound) has a higher quantum efficiency than silicon at NIR and SWIR wavelength ranges. Moreover, germanium has a wider absorption spectrum range than silicon at NIR and SWIR wavelength ranges. Conversely, silicon sensors are commonly used in CMOS image sensing or ambient light sensing at the visible wavelength range. Accordingly, it would be beneficial to integrate germanium and silicon sensors on a common die. Example photodetectors that integrate germanium and silicon sensors on a common region of a silicon substrate are disclosed in U.S. patent application Ser. No. 15/952,053, titled "Silicon germanium imager with photodiode in trench" and filed on Apr. 12, 2018, which is fully incorporated by reference herein. As another example, the germanium photodetectors and the silicon photodetectors can be formed on separate regions (e.g., first region 104 and second region 106) of the silicon substrate.

Continuing with the example above, in some embodiments, the photodetector array 102 can be formed on a first die, and the first circuitry 108 and the second circuitry 110 can be formed on a second die, where the first die can be bonded to the second die to form a single chip. For example, referring to FIG. 3, a first subset of germanium photodetectors corresponding to first region 104 and a second subset of silicon photodetectors corresponding to second region 106 can be formed on a silicon substrate 302, the first circuitry 108 and the second circuitry 110 can be formed on a silicon substrate 304. The first die formed on silicon substrate 302 can then be bonded to the second die formed on silicon substrate 304 via a bonding interface 306 to form a single chip 300. Such die stacking can reduce an overall package size for the sensor device. One additional technical benefit with die stacking is that the flexible arrangement of germanium and silicon photodetectors depending on the intended application. For example, the germanium photodetectors and the silicon photodetectors can be formed on separate regions (e.g., first region 104 and second region 106) of the silicon substrate, where each region is specifically for a corresponding application. As another example, the pixels of the germanium photodetectors and the silicon photodetectors can be interdigitated to form a larger overall sensing area. As another example, the pixels of the germanium photodetectors and the silicon photodetectors can be divided into multiple sub-groups (or blocks) for better resolution, where the sub-groups can then be interdigitated to form a larger overall sensing area.

Figure 4A:
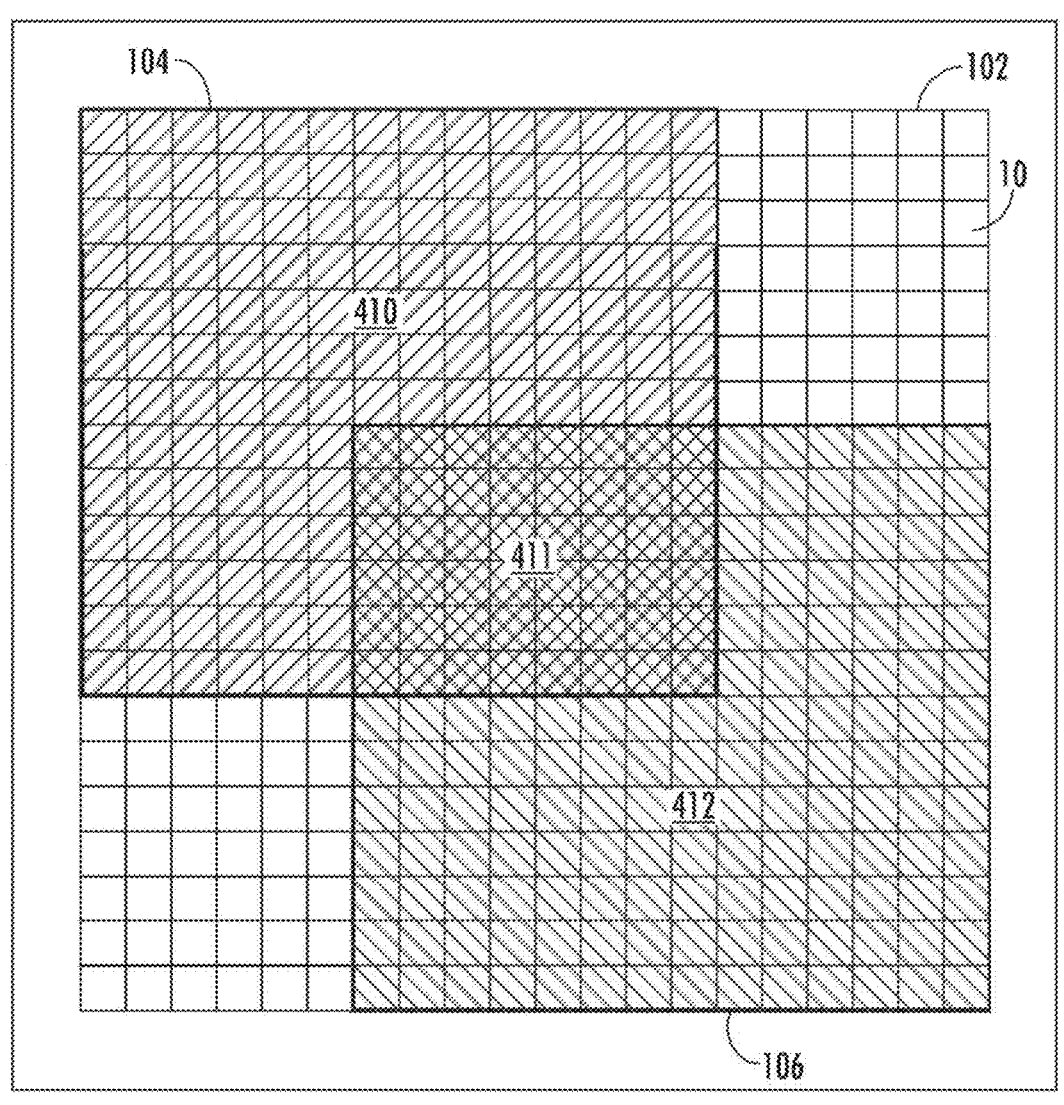
FIG. 4A illustrates exemplary embodiments of an optical sensing apparatus.
Figure 4B:
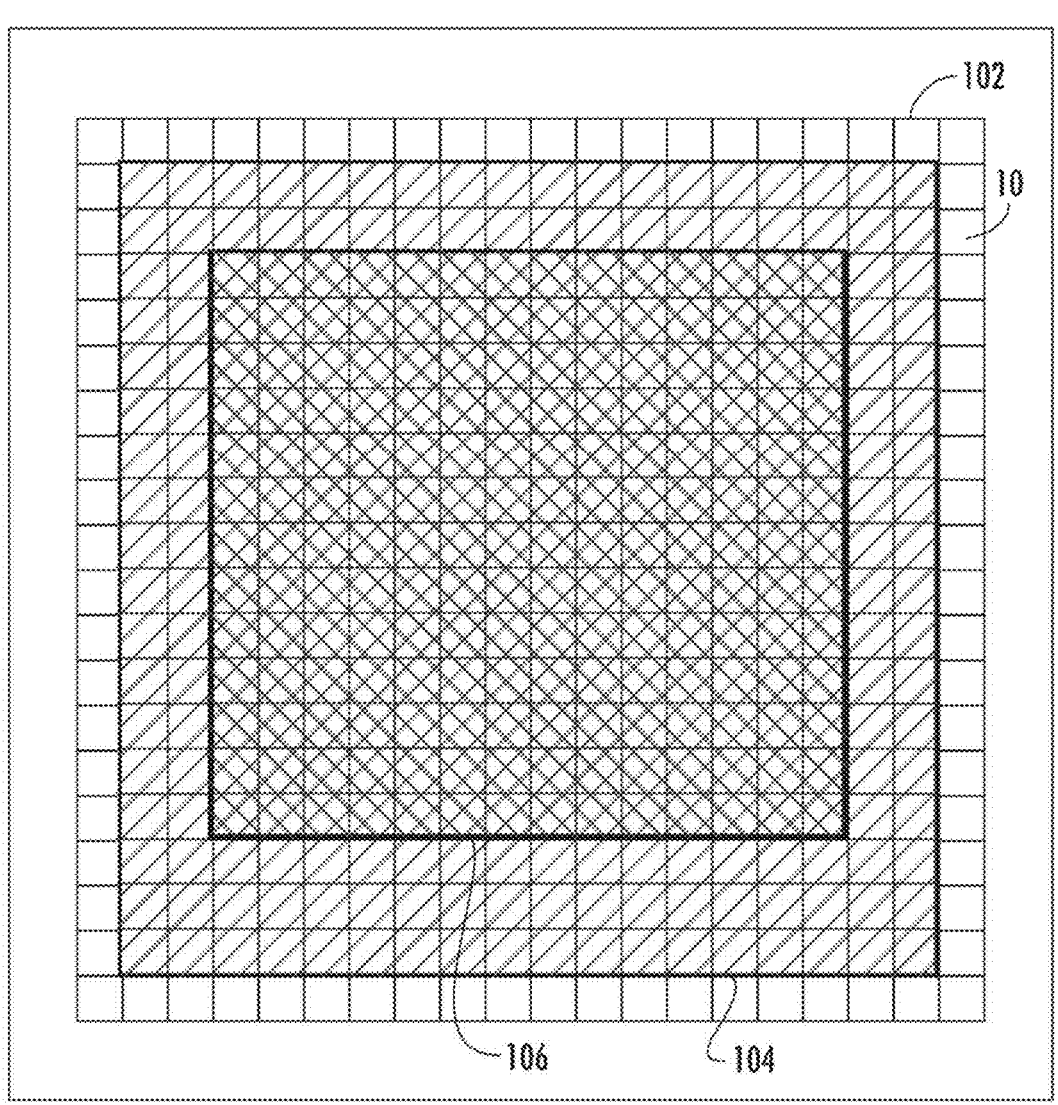
FIG. 4B illustrates exemplary embodiments of an optical sensing apparatus.

FIGS. 4A-4C provide additional examples of first and second regions of photodetectors in accordance with the disclosed technology. FIG. 4A illustrates exemplary embodiments of an optical sensing apparatus 400A, while FIG. 4B illustrates exemplary embodiments of an optical sensing apparatus 400B, and FIG. 4C illustrates exemplary embodiments of an optical sensing apparatus 400C. Such exemplary embodiments are intended to illustrate that the first and second regions of photodetectors (e.g., a first region 104 and second region 106) may not have distinctive areas (e.g., areas that do not overlap with each other). The unique nature of germanium-on-silicon sensor technology can accommodate a variety of configurations. More particularly, due to (i) the 2D array feature of the sensor and (ii) the 3D stacking of germanium device chip with circuit chip, the regions assigned to a particular application or combination of applications can be arbitrarily assigned (e.g., pixels grouped/separated by programmable logic and not by physical barriers) and/or dynamically interchangeable.

FIG. 4A illustrates exemplary embodiments of an optical sensing apparatus 400A. The optical sensing apparatus 400A includes a photodetector array 102 comprising a plurality of photodetectors 10, where each photodetector is configured to perform optical sensing. For supporting multiple applications, the photodetector array 102 can be partitioned into two or more regions. In one embodiment, as illustrated in FIG. 4A, a first subset of the plurality of photodetectors 10 are grouped as a first region 104 for detecting a first optical signal, and a second subset of the plurality of photodetectors 10 are grouped as a second region 106 for detecting a second optical signal. The first region 104 and second region 106 are configured to include a first distinct portion 410 of photodetectors 10 that are unique to first region 104, an overlap portion 411 of photodetectors 10 that are included in both the first region 104 and the second region 106, and a second distinct portion 412 of photodetectors 10 that are unique to the second region 106. It should be appreciated that the size of first region 104, second region 106, and/or overlap portion 411 can vary depending on the types of applications desired in a multi-application sensor embodiment.

In some instances, the first optical signal detected by the first region 104 of optical sensing apparatus 400A can be obtained at the same time as the second optical signal detected by the second region 106 of optical sensing apparatus 400A. In some instances, the first optical signal detected by the first region 104 of optical sensing apparatus 400A can be obtained at a first time or a first series of times that is different than a second time or a second series of times at which the second optical signal detected by the second region 106 of optical sensing apparatus 400A.

FIG. 4B illustrates exemplary embodiments of an optical sensing apparatus 400B. The optical sensing apparatus 400B includes a photodetector array 102 comprising a plurality of photodetectors 10, where each photodetector is configured to perform optical sensing. For supporting multiple applications, the photodetector array 102 can be partitioned into two or more regions. In one embodiment, as illustrated in FIG. 4B, a first subset of the plurality of photodetectors 10 are grouped as a first region 104 for detecting a first optical signal (e.g., germanium photodetectors for detecting SWIR signals), and a second subset of the plurality of photodetectors 10 are grouped as a second region 106 for detecting a second optical signal (e.g., silicon photodetectors for detecting visible-wavelength signals). The first region 104 and second region 106 are configured such that the entirety of second region 106 overlaps with first region 104, and in other words the photodetectors 10 within second region 106 are a subset of the photodetectors 10 within first region 104. Again, it should be appreciated that the size of first region 104, second region 106, and/or the location of second region 106 within first region 104 can vary depending on the types of applications desired in a multi-application sensor embodiment.

In some instances, the first optical signal detected by the first region 104 of optical sensing apparatus 400B can be obtained at the same time as the second optical signal detected by the second region 106 of optical sensing apparatus 400B. In some instances, the first optical signal detected by the first region 104 of optical sensing apparatus 400B can be obtained at a first time or a first series of times that is different than a second time or a second series of times at which the second optical signal detected by the second region 106 of optical sensing apparatus 400B.

FIG. 4C illustrates exemplary embodiments of an optical sensing apparatus 400C. The optical sensing apparatus 400C includes a photodetector array 102 comprising a plurality of photodetectors 10, where each photodetector is configured to perform optical sensing. For supporting multiple applications, the photodetector array 102 can be partitioned into two or more regions. In one embodiment, as illustrated in FIG. 4C, a first subset of the plurality of photodetectors 10 are grouped as a first region 104 for detecting a first optical signal, and a second subset of the plurality of photodetectors 10 are grouped as a second region 106 for detecting a second optical signal. The first region 104 and second region 106 are configured such that the entirety of second region 106 overlaps with first region 104 and the entirety of the first region 104 overlaps with the second region 106.

In some instances, such as when germanium and silicon photodetectors are interdigitated within the photodetector array 102, the first region 104 may be formed using germanium on a silicon substrate, and the second region 106 may be formed on the silicon substrate, allowing for a first optical signal detected by the first region 104 of optical sensing apparatus 400C to be obtained at the same time as the second optical signal detected by the second region 106 of optical sensing apparatus 400C. In some instances, the first optical signal detected by the first region 104 of optical sensing apparatus 400C can be obtained at a first time or a first series of times that is different than a second time or a second series of times at which the second optical signal detected by the second region 106 of optical sensing apparatus 400C.

Although not illustrated in FIGS. 4A-4C, it should be appreciated that such optical sensing apparatuses 400A/400B/400C can additionally include any combination of the first circuitry 108, second circuitry 110, adjustment circuitry 1121, light emitter 116, driver 118, output circuitry 1122, and/or other components described herein or understood by one of ordinary skill in the art.

Figure 5A:
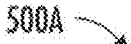
FIG. 5A illustrates exemplary embodiments of an optical sensing apparatus.
Figure 5B:
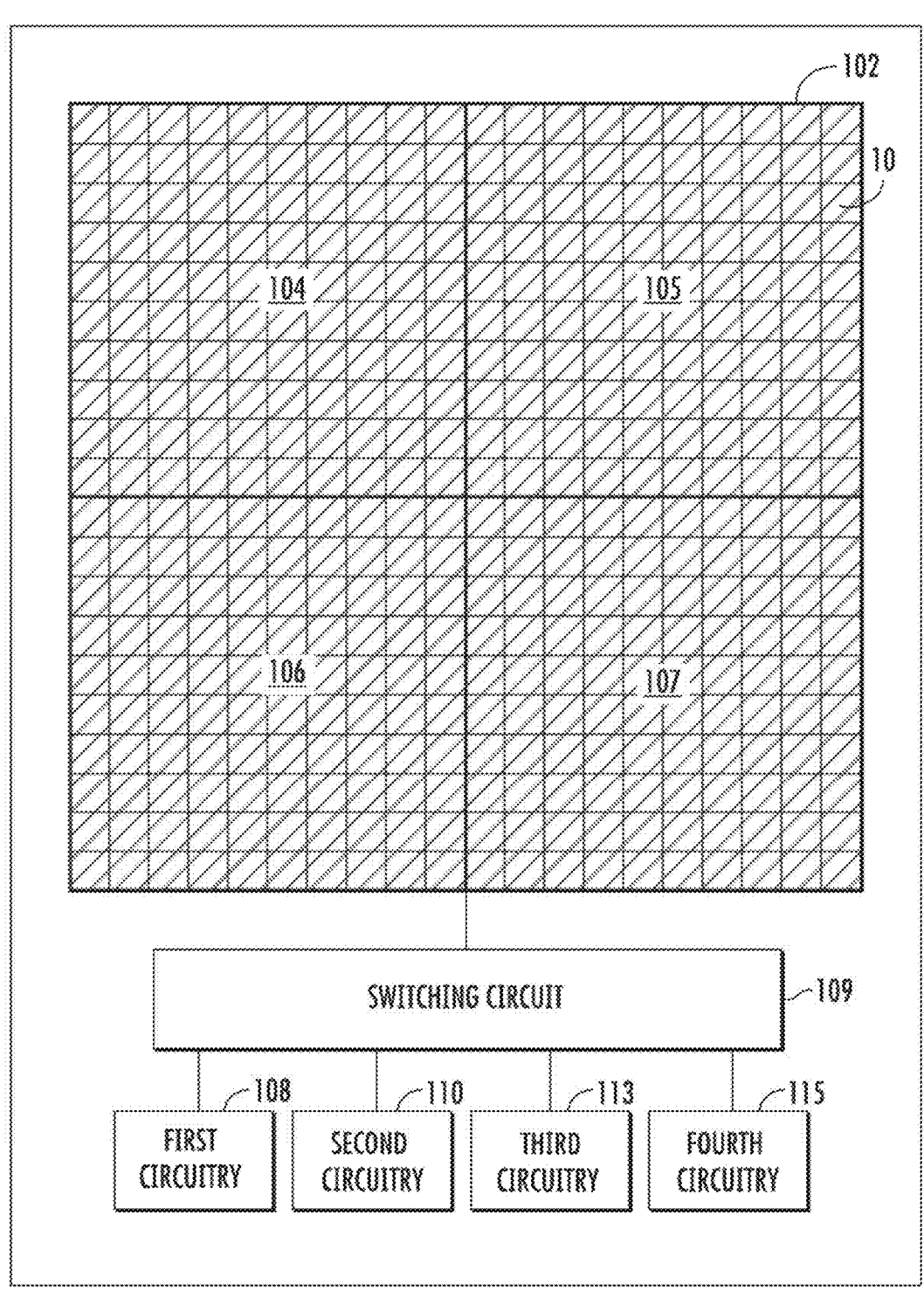
FIG. 5B illustrates exemplary embodiments of an optical sensing apparatus.

FIGS. 5A-5B provide additional examples of circuitry configurations for use with optical sensing apparatuses 500A and 500B respectively. The circuitry configurations illustrated in FIG. 5A and FIG. 5B could additionally or alternatively be incorporated with any of the optical sensing apparatuses 100A/100B/200A/200B/400A/400B/400C depicted herein or other optical sensing apparatuses as would be understood therefrom.

Referring more particularly to FIG. 5A, the optical sensing apparatus 500A includes a photodetector array 102 comprising a plurality of photodetectors 10, where each photodetector is configured to perform optical sensing. For supporting multiple applications, the photodetector array 102 can be partitioned into two or more regions. In one embodiment, as illustrated in FIG. 5A, a first subset of the plurality of photodetectors 10 are grouped as a first region 104 for detecting a first optical signal, and a second subset of the plurality of photodetectors 10 are grouped as a second region 106 for detecting a second optical signal. In addition, a third subset of the plurality of photodetectors 10 are grouped as a third region 105 for detecting a third optical signal, and a fourth subset of the plurality of photodetectors 10 are grouped as a fourth region 107 for detecting a fourth optical signal. Although the first region 104, second region 106, third region 105, and fourth region 107 are illustrated in FIG. 5A as distinct regions, it should be appreciated that such regions may be configured to variously overlap one another in other example embodiments. In addition, although four regions are illustrated in FIG. 5A, it should be appreciated that a greater or lesser number of regions may be employed.

The optical sensing apparatus 500A includes a first circuitry 108, respectively coupled (e.g., electrically coupled) to the first region 104, second region 106, third region 105, and fourth region 107. In some instances, the first circuitry 108 is coupled to the various regions 104-107 by way of a switching circuit 109. Switching circuit 109 can be configured to selectively connect one or more of the first region 104, second region 106, third region 105 and/or fourth region 107 to the first circuitry 108 by way of hardware or software switches provided within switching circuit 109. First circuitry 108 can thus provide a single circuitry (e.g., an FPGA or a generalized processor) that can connect to the same or different regions of the optical sensing apparatus 500A at the same time or different times.

Referring more particularly to FIG. 5B, the optical sensing apparatus 500B includes a photodetector array 102 comprising a plurality of photodetectors 10, where each photodetector is configured to perform optical sensing. For supporting multiple applications, the photodetector array 102 can be partitioned into two or more regions. In one embodiment, as illustrated in FIG. 5B, a first subset of the plurality of photodetectors 10 are grouped as a first region 104 for detecting a first optical signal, and a second subset of the plurality of photodetectors 10 are grouped as a second region 106 for detecting a second optical signal. In addition, a third subset of the plurality of photodetectors 10 are grouped as a third region 105 for detecting a third optical signal, and a fourth subset of the plurality of photodetectors 10 are grouped as a fourth region 107 for detecting a fourth optical signal. Although the first region 104, second region 106, third region 105, and fourth region 107 are illustrated in FIG. 5B as distinct regions, it should be appreciated that such regions may be configured to variously overlap one another in other example embodiments. In addition, although four regions are illustrated in FIG. 5B, it should be appreciated that a greater or lesser number of regions may be employed.

The optical sensing apparatus 500B includes a first circuitry 108 configured to perform a first function, a second circuitry 110 configured to perform a second function, a third circuitry 113 configured to perform a third function, and a fourth circuitry 115 configured to perform a fourth function. The first circuitry 108, second circuitry 110, third circuitry 113, and fourth circuitry 115 are respectively coupled (e.g., electrically coupled) to the first region 104, second region 106, third region 105, and fourth region 107. In some instances, the first circuitry 108, second circuitry 110, third circuitry 113 and/or fourth circuitry 115 are coupled to the various regions 104-107 by way of a switching circuit 109. Switching circuit 109 can be configured to selectively connect one or more of the first region 104, second region 106, third region 105 and/or fourth region 107 to the first circuitry 108, second circuitry 110, third circuitry 113, and/or fourth circuitry 115 by way of hardware or software switches provided within switching circuit 109.

Example sensors that can be implemented on germanium or silicon include (but not limited to) photodiodes, CMOS image sensors (CIS), direct time-of-flight (dToF), indirect time-of-flight (iToF) sensors, avalanche photodiodes (APD), single-photon avalanche diodes (SPAD), or a combination thereof for applications such as range sensing, proximity sensing, gesture recognition, object tracking, ambient light sensing, high-resolution 3D imaging, etc.

As one example, the first region 104 of the photodetector array 102 may be germanium photodiodes arranged to receive an optical signal within the NIR/SWIR wavelength range (e.g., through an IR filter on the die or on the package), and the second region 106 may be silicon photodiodes arranged to receive an optical signal within the visible wavelength range (e.g., through a visible color filter on the die or on the package). The first circuitry 108 may be implemented to perform a proximity sensing application and the second circuitry 110 may be implemented to perform an ambient light sensing application, where the first circuitry 108 and the second circuitry 110 are formed on a common substrate. Upon bonding the photodetector array 102 with the first circuitry 108 and the second circuitry 110 to form a single chip, such chip may perform both proximity sensing and ambient light sensing applications on one chip with two different types of sensors formed on a common silicon substrate.

As another example, the first region 104 of the photodetector array 102 may be silicon or germanium photodiodes arranged to receive an optical signal within the NIR/SWIR wavelength range (e.g., through an IR filter on the die or on the package), and the second region 106 may be germanium ToF sensors arranged to receive an optical signal within the NIR/SWIR wavelength range (e.g., through an IR filter on the die or on the package). The first circuitry 108 may be implemented to perform a low-power sensing application and the second circuitry 110 may be implemented to perform a high-resolution ToF sensing application, where the first circuitry 108 and the second circuitry 110 are formed on a common substrate. Upon bonding the photodetector array 102 with the first circuitry 108 and the second circuitry 110 to form a single chip, such chip may perform both low-power detection sensing (e.g., a trigger event) and high-resolution 3D imaging (e.g., a higher power application to be performed after the trigger event) applications on one chip with two different types of sensors formed on a common silicon substrate.

As another example, the first region 104 of the photodetector array 102 may be germanium ToF sensors arranged to receive an optical signal within the NIR/SWIR wavelength range (e.g., through an IR filter on the die or on the package), and the second region 106 may be silicon CIS sensors arranged to receive an optical signal within the visible wavelength range (e.g., through a visible color filter on the die or on the package). The first circuitry 108 may be implemented to perform a high-resolution 3D imaging application and the second circuitry 110 may be implemented to perform a high-resolution CIS imaging application in color, where the first circuitry 108 and the second circuitry 110 are formed on a common substrate. Upon bonding the photodetector array 102 with the first circuitry 108 and the second circuitry 110 to form a single chip, such chip may perform both high-resolution 3D sensing and high-resolution color imaging applications on one chip with two different types of sensors formed on a common silicon substrate.

As another example, the first region 104 of the photodetector array 102 may be arranged to receive an optical signal (e.g., an image) upon illumination of an environment by a first laser configured to emit light at a first wavelength (e.g., about 1350 nm), while the second region 106 of the photodetector array 102 may be arranged to receive an optical signal (e.g., an image) upon illumination of an environment by a second laser configured to emit light at a second wavelength (e.g., about 940 nm). The amplitude portion of a first optical signal obtained at the first region 104 can then be combined with that of a second optical signal obtained at the second region 106 to generate an NIR/SWIR 3D image with better features from a different light spectrum. One example manner of implementing such example can involve capturing a first image at the first wavelength at a first time and then capturing a second image at the second wavelength at a second time using, for example, optical sensing apparatus 400C of FIG. 4C. Another example manner of implementing such an example can involve capturing a first image at the first wavelength and a second image at the second wavelength at the same time by illuminating the first laser and the second laser simultaneously and using two different sections of a photodetector array to capture two images, followed by post-processing with circuitry.

In some embodiments, an isolation structure 114 (e.g., case) can be added to separate the first region 104 and the second region 106. In some implementations, one or more passive optical elements (e.g., optical filters) can be added to filter light incident on the first region 104 and/or the second region 106. For example, an optical filter may be added along the optical path to the first region 104 such that the first region 104 receives reflected light at 940 nm but does not receive reflected light at 1310 nm. Conversely, another optical filter may be added along the optical path to the second region 106 such that the second region 106 receives reflected light at 1310 nm but does not receive reflected light at 940 nm.

In some embodiments, an isolation structure 120 (e.g., case) can be added to separate the light emitter 116 and the photodetector array 102.

In some embodiments, as illustrated in FIG. 1A and FIG. 2B, the photodetector array 102 including the first region 104 and the second region 106, the first circuitry 108 the second circuitry 110 and the processing circuitry 112 can be formed on a single die 150.

Figure 3:
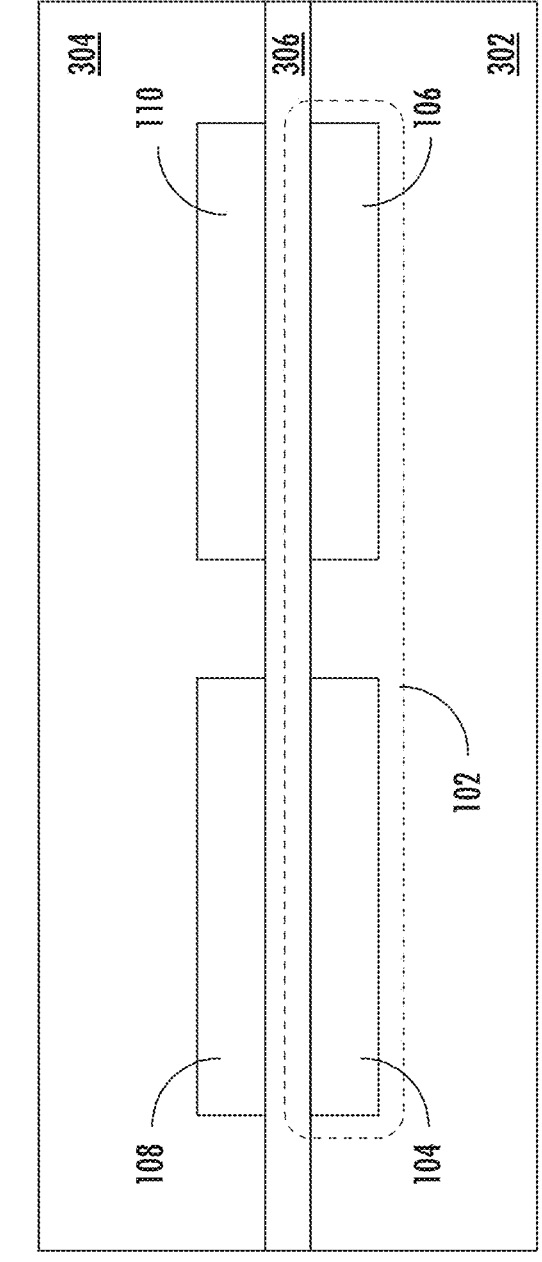
FIG. 3 illustrates exemplary embodiments of an optical sensing apparatus.

In some embodiments, as illustrated in FIG. 1B and FIG. 2B, the photodetector array 102 including the first region 104 and the second region 106, the first circuitry 108 the second circuitry 110, the processing circuitry 112 and the driver 118 can be formed on a single die 160. In some other implementations, the photodetector array 102, the first circuitry 108, and the second circuitry 110 may be implemented on separate dies to form a single chip (e.g., as shown in FIG. 3), and the processing circuitry 112 and/or the driver 118 may be implemented on one or more separate chips.

In some embodiments, an optical sensing apparatus (e.g., 100A/100B/200A/200B/400A/400B/400C/500A/500B) may be employed in a variety of optical sensing applications. For instance, optical signals can be obtained upon illumination at a generally higher wavelength (e.g., in the range of between about 1400-1800 nm) to determine what category of substance is inside a container (e.g., determining whether a container includes a gas, a fluid or a solid). This information can provide beneficial use in applications such as security checks before boarding public transportation, for instance, in determining whether a bottle contains water or not. Optical signals obtained in accordance with aspects of the disclosed technology can be used to help determine a health rating of the condition of produce (e.g., wherein the health rating can be indicative of the ripeness of a produce sample). Optical signals obtained in accordance with aspects of the disclosed technology can be used for facial recognition applications by using a first optical signal to analyze the shape of a face and a second optical signal to determine whether light is absorbed by human skin (thus indicating a likely real face as opposed to a non-human replica). Additional potential applications include multi-application imaging for user computing devices such as smart phones, smart watches, or other portable or wearable electronic devices.

Figure 6:
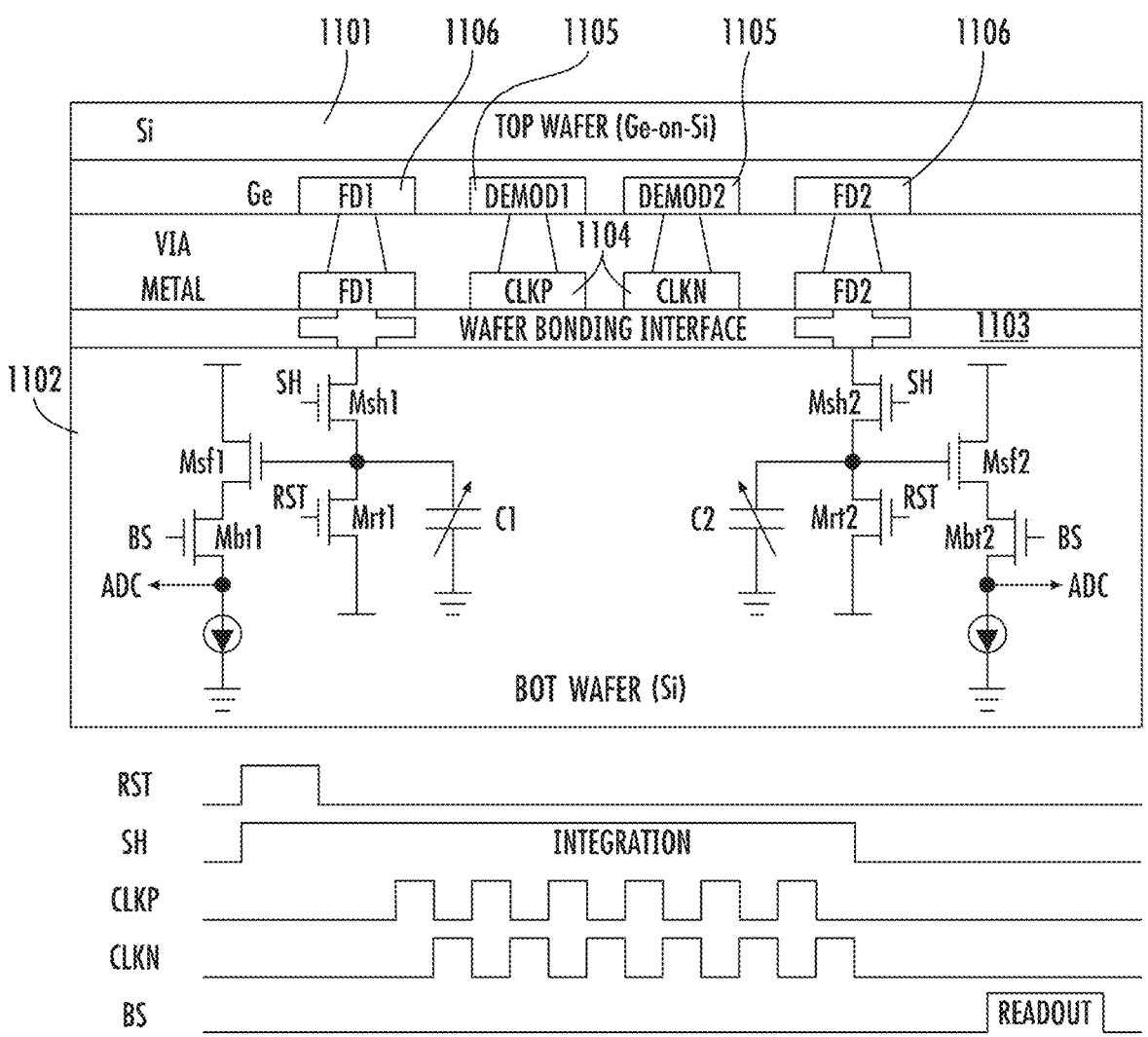
FIG. 6 depicts a cross-section view of a portion of an example photodetector according to example aspects of the present disclosure.

By way of example, a pixel array can be implemented in a Germanium-on-Silicon (Ge-on-Si) platform. FIG. 6 shows an example pixel array cross-section (and clock signals suitable for use in a pixel array) in a Ge-on-Si platform. The example pixel array depicted in FIG. 6 implements a Ge-on-Si architecture, which can allow for absorption of wavelengths in the near-infrared (NIR, e.g., wavelength range from 780 nm to 1400 nm, or any similar wavelength range as defined by a particular application) and short-wave infrared (SWIR, e.g., wavelength range from 1400 nm to 3000 nm, or any similar wavelength range as defined by a particular application) spectrum. This can allow for better signal-to-noise ratios (SNR) to be achieved while staying within maximum permissible exposure limits (MPE).

The Ge-on-Si platform can be associated with an i-ToF image sensor. For example, the i-ToF image sensor can be developed in a back-side illumination (BSI) configuration, in which the Ge region is formed on a first wafer 1101 (e.g., silicon substrate 302) and one or more circuits are located on a second wafer 1102 (e.g., silicon substrate 304). The first wafer 1101 and the second wafer 1102 can be bonded together through a wafer bonding interface 1103. In some embodiments, the pixels can follow a two-tap lock-in pixel architecture. One or more differential demodulation clocks 1104 (e.g., CLKP, CLKN) can be distributed on the first wafer 1101 so as, for example, to create a continuously switching lateral electric field at the Ge surface (e.g., the side closer to VIA) between first node(s) 1105 (e.g., Demod1, Demod2) in every pixel. Photo-charges can be collected through second node(s) 1106 (e.g., FD1, FD2). In some embodiments, since most of the photo-charges can be generated inside the Ge layer and the Ge layer can be thin, the lateral electric field at the Ge surface can effectively sweep the photo-charges to the second node(s) 1106. Moreover, the transit time for the photo-charges drifting to one or more of the second node(s) 1106 (e.g., FD1 and/or FD2) can be short, again, due to the thin Ge layer, and therefore the demodulation speed can be significantly improved. In some embodiments, to minimize the coupling to any sensitive high-impedance node and relax the design rule requirement, the second node(s) 1106 (e.g., FD1 and/or FD2) can be interacted with the wafer bonding interface overlapping with the pixel area. The one or more differential demodulation clocks 1104 (e.g., CLKP and/or CLKN) can be routed to the second wafer 1102 clock drivers outside the pixel region. The pixel demodulation drivers can be realized with tapered inverter chains and the supply of the inverter chains can be adjusted to maximize performance. In some embodiments, the pixel circuits can be implemented as a differential 4-transistor architecture. A simplified timing diagram is also shown in the bottom of FIG. 6. Before every exposure, all pixels can be reset through Msh1/Msh2 and Mrt1/Mrt2 controlled by signal RST. After optical exposure, integration, and demodulation, the collected photo-charges can be stored on C1 and C2 controlled by signal SH. Finally, the readout to ADC can be accomplished through the source follower Msf1/Msf2 and the row-select switch Mbt1/Mbt2 controlled by signal BS. In some embodiments, 4-quad measurements can be implemented to recover the depth information without suffering from analog non-idealities.

The present disclosure provides some embodiments of reconfigurable optical sensing apparatuses and methods, including one or more ROIs to receive wanted or unwanted optical signals for performing optical measurements. The size, location and/or partition of these ROIs are configurable to have the measurements more accurate and can be used in many novel applications. Moreover, the photodetectors in each ROI may include a light-absorption material (e.g., germanium or III-IV material) formed on a silicon substrate to absorb the optical signal having longer wavelength (e.g., the wavelength is longer than 1000 nm). This can include, for example, the example platform discussed with reference to FIG. 6.

FIGS. 7-10 disclose a flexible circuitry integration architecture for an optical sensor. An optical sensor (e.g., the optical sensing apparatus 100A/100B/200A/200B) typically operates along the following steps. A photo-detecting element having one or more light absorption regions (e.g., silicon, germanium, III-V materials, etc.) receives an optical signal, and generates a photo-current in response to the optical signal. An analog-front-end circuitry (e.g., a low-noise preamplifier) then converts the photo-current at the current domain to an analog signal at the voltage domain. A transimpedance amplifier (TIA) circuitry then amplifies the analog signal at the voltage domain. An analog-to-digital converter (ADC) circuitry then converts the amplified analog signal into a digital signal. The digital signal may be further processed by one or more processors (e.g., a micro-controller) and/or stored in a memory for the optical sensor's intended application(s).

When a photo-detecting element and the circuitry (e.g., CMOS circuitry) are designed by different entities (e.g., different companies), an integration between the photo-detecting element and circuitry may be challenging from a technical perspective. Using the analog-front-end circuitry (AFE circuitry) as an example, operations of the AFE circuitry are highly dependent on various properties of the photo-detecting element (e.g., dark current, operating bias, photo-responsivity, non-linearity, etc.). Therefore, the first entity that designs the photo-detecting element would generally be the most suitable entity to design the AFE circuitry. Moreover, the AFE circuitry converts electrical signals from the current domain to the voltage domain, which generally reduces the complexity of the designs of subsequent circuitry by the second entity. However, in many cases, the photo-detecting element is fabricated on a non-silicon material (e.g., III-V material) and therefore circuitry, which is typically fabricated on silicon, cannot be formed on the same material. To achieve better integration, the design of the AFE circuitry often becomes the responsibility of the second entity designing the rest of the circuitry. In that case, the circuit designer from the second entity, who may know little about the photo-detecting element designed by the first entity, would need to gather many parameters related to the properties of the photo-detecting element. The performance of the AFE circuitry may not be optimized, and the overall design time may be increased. Accordingly, there exists a need for a technical solution to integrate circuitry on different platforms for optical sensors. This disclosure describes a germanium-based optical sensor implemented on a germanium-on-silicon platform that can be further integrated with circuitry implemented on multiple silicon platforms. Such implementations provide several technical advantages including smaller form factor (e.g., vertical stacking), lower system costs, reliable wafer-level integration, and simplified circuit design (e.g., AFE circuitry designed and integrated with photodetectors, providing an output to subsequent circuitry at voltage domain, etc.).

Figure 7:
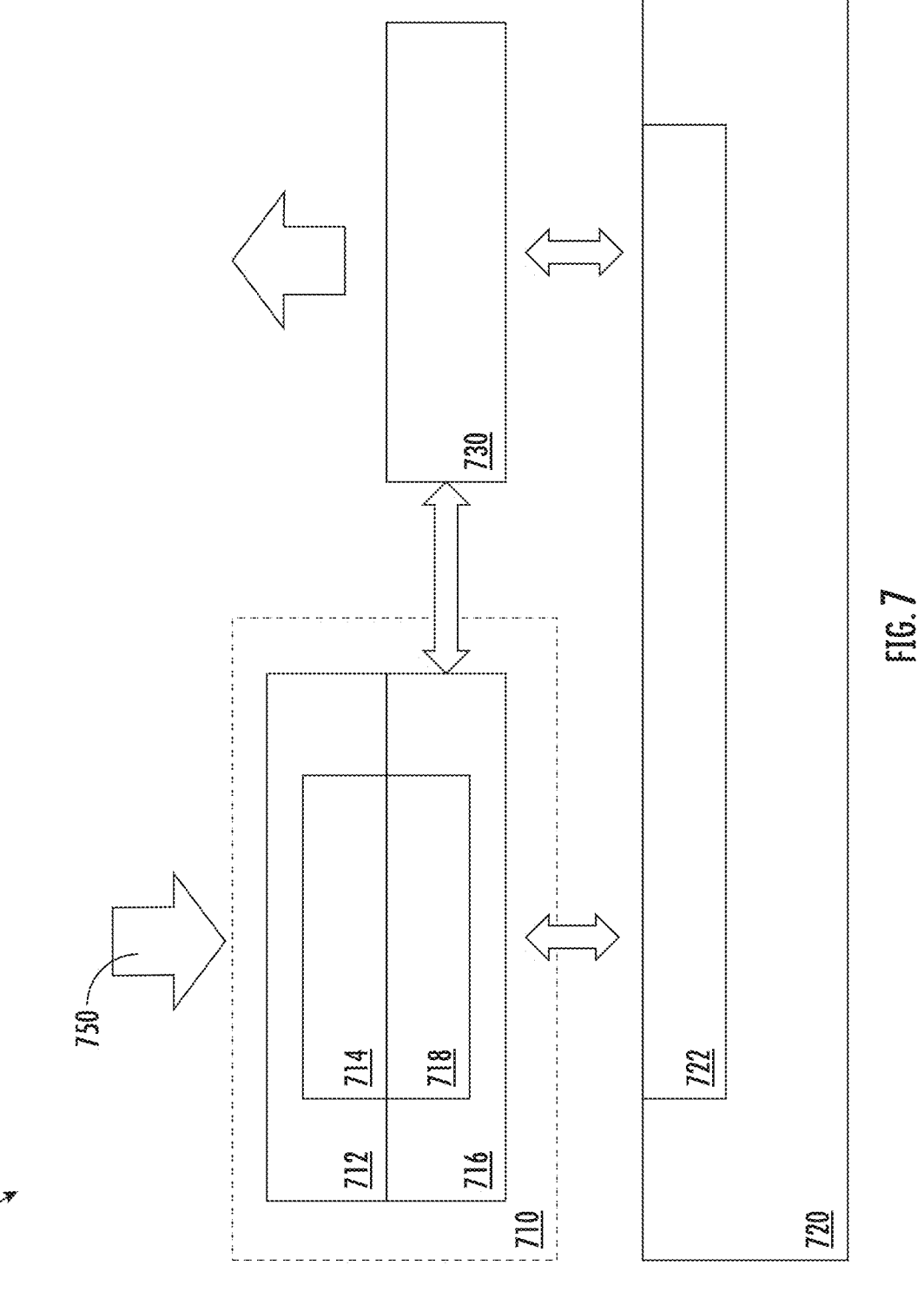
FIGS. 7-10 illustrate exemplary embodiments of an optical sensing apparatus, according to example aspects of the present disclosure.

FIG. 7 illustrates an example of an optical sensing apparatus 700. The optical sensing apparatus 700 includes a photodetector 710. The photodetector 710 includes a first substrate 712 formed using a first material (e.g., silicon), and an absorption region 714 formed on or at least partially in the first substrate 712. The absorption region 714 is formed using a second material (e.g., germanium), where the absorption region 714 is configured to receive an optical signal 750 and to generate a photo-current in response to receiving the optical signal 750. Using a germanium-on-silicon platform as an example, germanium-based materials (e.g., undoped/doped germanium, silicon-germanium compounds, etc.) may be deposited on a silicon-based substrate or in pattern-etched trenches in the silicon-based substrate using a CMOS-compatible fabrication process. The germanium-based materials may be used as one or more absorption regions for detection of NIR or SWIR light (e.g., the optical signal 750).

In some implementations, the absorption region 714 may include an array of pixels (e.g., photodetector array 102 as described in referenced to FIG. 1A). For example, a one-dimensional or a two-dimensional (e.g., 100 by 100 pixels, or any suitable numbers) germanium pixels (e.g., a pixel of dimensions 3 μm by 3 μm, or any suitable area) may be formed on/in a silicon substrate to form one large photodetector (e.g., a photodetector of dimensions 300 μm by 300 μm, or any suitable area). In some implementations, the array of pixels can be electrically coupled together to generate one photo-current. In some other implementations, each pixel of the array of pixels can be electrically coupled to its own circuitry for reading out the photo-current.

In some implementations, the photodetector 710 further includes a lens array (e.g., polymer or silicon lens as described in reference to FIG. 11A-11C) and/or one or more layers of anti-reflection coatings configured to focus the optical signal 750 to the array of pixels.

The photodetector 710 further includes a second substrate 716 (e.g., silicon substrate 304 in FIG. 3) bonded to the first substrate 712 (e.g., silicon substrate 302 in FIG. 3), where the second substrate 716 is formed using the first material (e.g., silicon). Using a germanium-on-silicon platform as an example, the first (silicon) substrate 712 may be bonded to the second (silicon) substrate 716 by wafer bonding.

Figure 8:
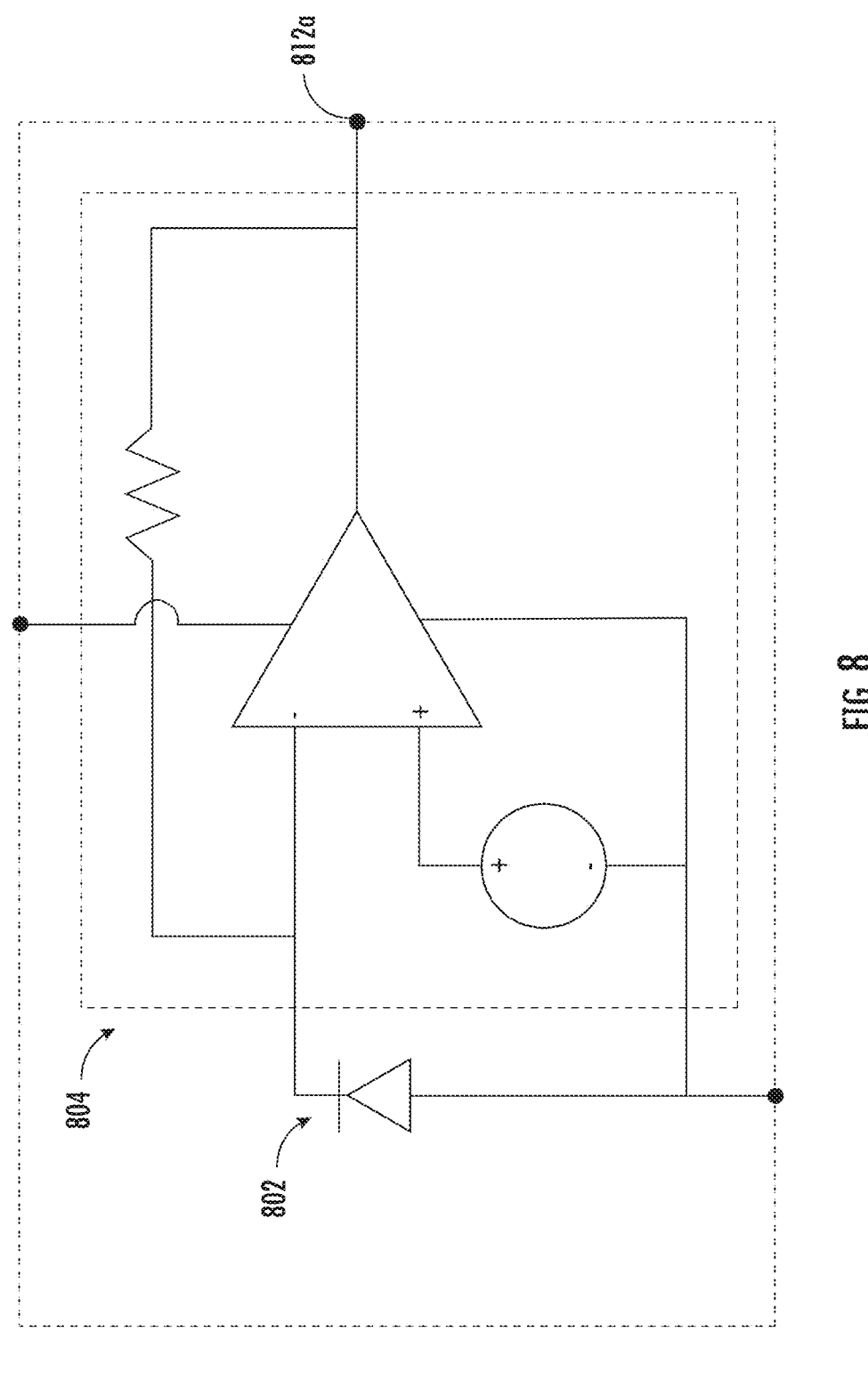

The photodetector 710 includes circuitry 718 formed in the second substrate 716, where the circuitry 718 is configured to convert the photo-current and to an analog voltage output for processing. For example, the circuitry 718 may include an AFE circuitry fabricated using a CMOS process. Referring to FIG. 8 as an example, the circuitry 800 includes a photodiode 802, which can be a circuit-equivalent of a germanium-on-silicon platform (e.g., absorption region 714 formed in the first substrate 712) that provides a photocurrent in response to receiving an optical signal. The circuitry 800 further includes a low-noise preamplifier 804, which converts the photocurrent to an analog voltage output 812a.

The optical sensing apparatus 700 further includes a third substrate 720 coupled to the photodetector 710, where the third substrate 720 includes circuitry 722 configured to process the analog voltage output to generate a digital output (e.g., first circuitry 108, second circuitry 110, or adjustment circuitry 1121). For example, the circuitry 722 may include an amplifier circuitry configured to amplify the voltage output, an analog-to-digital converter configured to convert the amplified voltage output to a digital signal, and a micro-controller configured to process the digital signal.

In some implementations, the second substrate 716 and the third substrate 720 may be bonded together by techniques such as flip-chip bonding. The circuitry 718 and the circuitry 722 may be electrically coupled using electrical vias and bond pads between the second substrate 716 and the third substrate 720. In some other implementations, the second substrate 716 and the third substrate 720 may be bonded together by wire-bonds.

In some implementations, any suitable portion of the circuitry 722 may be instead implemented in the circuitry 718. For example, if there is sufficient space on the second substrate 716, the amplifier circuitry, the ADC circuitry, and/or the MCU circuitry can be implemented in the circuitry 718. The circuitry 722 can then be used to implement circuitry that is independent of the properties of the absorption region 714. Accordingly, the design of the circuitry can be flexible.

In some implementations, the optical sensing apparatus 700 further includes a light emitter 730. The light emitter 730 may be electrically coupled to the circuitry 718 or the circuitry 722.

Figure 9:
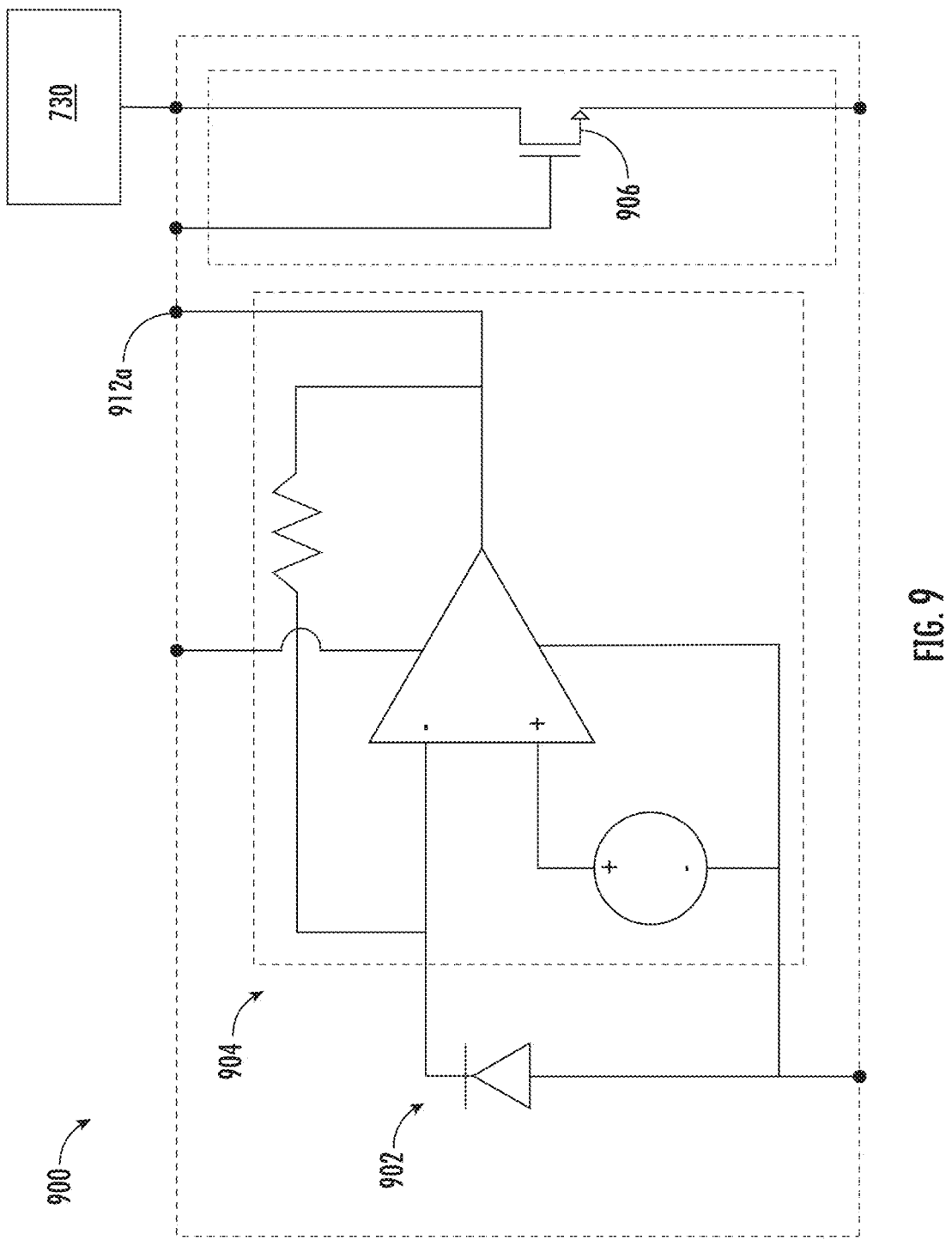

In some implementations, the circuitry 718 further includes driver circuitry (e.g., driver 118) for the light emitter 730. Referring to FIG. 9 as an example, the circuitry 900 includes a photodiode 902 (e.g., photodiode 802 in FIG. 8), which can be a circuit-equivalent of a germanium-on-silicon platform (e.g., absorption region 714 formed in the first substrate 712) that provides a photocurrent in response to receiving an optical signal. The circuitry 900 further includes a low-noise preamplifier 904 (e.g., low-noise pre-amplifier 804 in FIG. 8), which converts the photocurrent to an analog voltage output 912a. The circuitry 900 further includes driver circuitry 906 configured to drive the light emitter 730. Accordingly, a laser driver may be implemented on the germanium-on-silicon platform to control a light emitter 730, where the circuitry 722 may then be designed for application-specific circuitry instead of device-specific circuitry. This flexibility may enable the circuitry 722 to be integrated with multiple types of light emitter and photodetectors with minor circuit modification.

Figure 10:
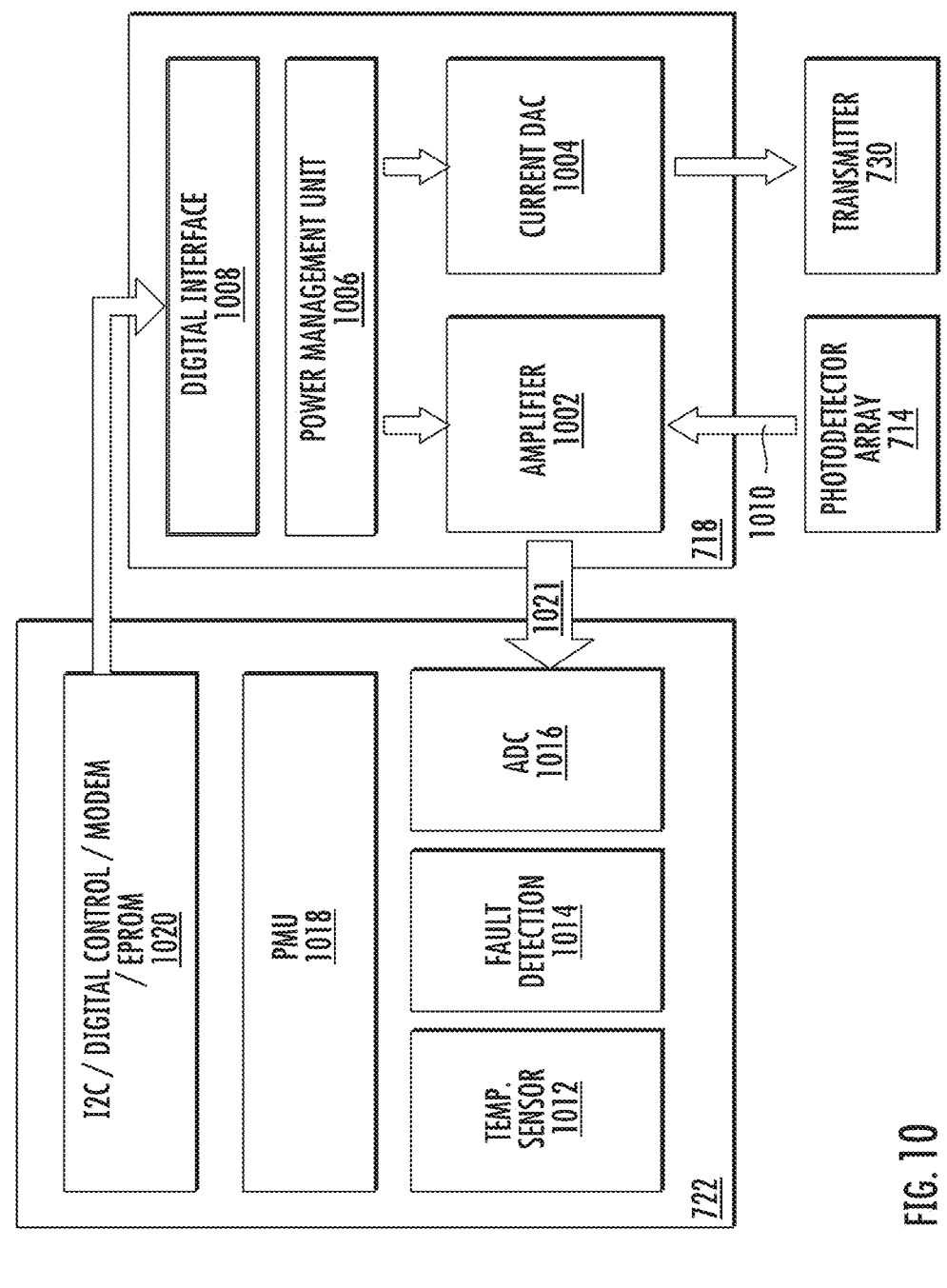

FIG. 10 shows a block diagram of an example optical apparatus 1000 that illustrates another non-limiting implementation of the circuitry 718 and the circuitry 722. The circuitry 718 and the absorption region 714 are formed on two bonded substrates (e.g., first substrate 712 and second substrate 716), as described in reference to FIG. 7. In general, the circuitry 718 can include optional customized circuitry blocks to fit different system and application requirements. In some implementations, the circuitry 718 can include a programmable amplifier 1002 (e.g., the low-noise preamplifier 804 plus another programmable amplifier, etc.) that receives a current input 1010 from the absorption region 714 and outputs a corresponding analog voltage output 1021.

In some implementations, the circuitry 718 can further include a current digital-to-analog converter (DAC) 1004 that receives a digital signal and converts the digital signal into an analog signal to drive the light emitter 730, which can be separate from or integrated on a common substrate as the absorption region 714 or the circuitry 718. For example, both the absorption region 714 and the light emitter 730 may be fabricated based on germanium-on-silicon material on the first substrate 712. In some implementations, the circuitry 718 and the absorption region 714 are integrated in one chip, where the absorption region 714 is composed of germanium for light absorption. In some implementations, the absorption region 714 includes one or more photodetectors composed of germanium for short wave infrared (SWIR) light absorption. In some implementations, the circuitry 718 can further include a small power management unit (PMU) 1006 and a digital interface 1008 that receive signals from the circuitry 722 for digital control.

In general, the circuitry 722 can include any relevant circuitry (e.g., analog-to-digital converter (ADC) 1016, fault detection circuitry 1014, temperature sensor 1012, PMU 1018, 12C/Digital Control/MODEM/EPROM circuitry 1020, and/or any other relevant circuitry) that converts the analog voltage output 1021 to a digital signal and processes the converted digital signal for the intended application(s). In some implementations, the ADC 1016 may include a multiplexer (MUX) that can receive analog inputs from multiple sensors to implement multiple sensing functions.

In some embodiments, a microlens array (e.g., silicon or oxide lens) may be formed on (e.g., bonded to) the photodetector array 102 to perform optical functions (e.g., focus) on the reflected optical signals propagating to the photodetector array 102. The design (e.g., lens curvature) of the microlens array may be different for different regions of the photodetector array 102 (e.g., the first region 104 and the second region 106). In some embodiments, a filter (e.g., one or more layers of thin film coating) may be applied to the microlens array, where each region of the photodetector array 102 may have a corresponding filter. For example, the first region 104 may be arranged to receive an optical signal with 940 nm, and the second region 106 may be arranged to receive an optical signal with 1310 nm. The portion of the microlens array that corresponds to the first region 104 may have one or more layers of thin film coatings that function as a bandpass filter for passing 940 nm but not 1310 nm. Similarly, the portion of the microlens array that corresponds to the second region 106 may have one or more different layers of thin film coatings that function as a bandpass filter for passing 1310 nm but not 940 nm. As another example, the first region 104 may be arranged to receive visible light and the second region 106 may be arranged to receive an optical signal with NIR and SWIR wavelength. Hence, the portion of the filter that corresponds to the second region 106 may have one or more layers of thin film coatings that function as a high pass filter for passing 850 nm and above, while the first region 104 may have a low pass filter coating for passing specific visible optical signals.

In some embodiments, an optical sensing apparatus (e.g., 100A/100B/200A/200B/400A/400B/400C/500A/500B) may include one or more lenses to perform optical functions (e.g., focus, collimate, etc.) on the transmitted or reflected optical signals.

In some embodiments, the first optical signal detected by the first subset of the plurality of photodetectors 10 in the first region 104 may be filtered by a wavelength filter (e.g., IR filter) such that a wavelength of the first optical signal can be confined within a predetermined range, and the second optical signal detected by the second subset of the plurality of photodetectors 10 in the second region 106 may not be filtered.

Figure 11A:
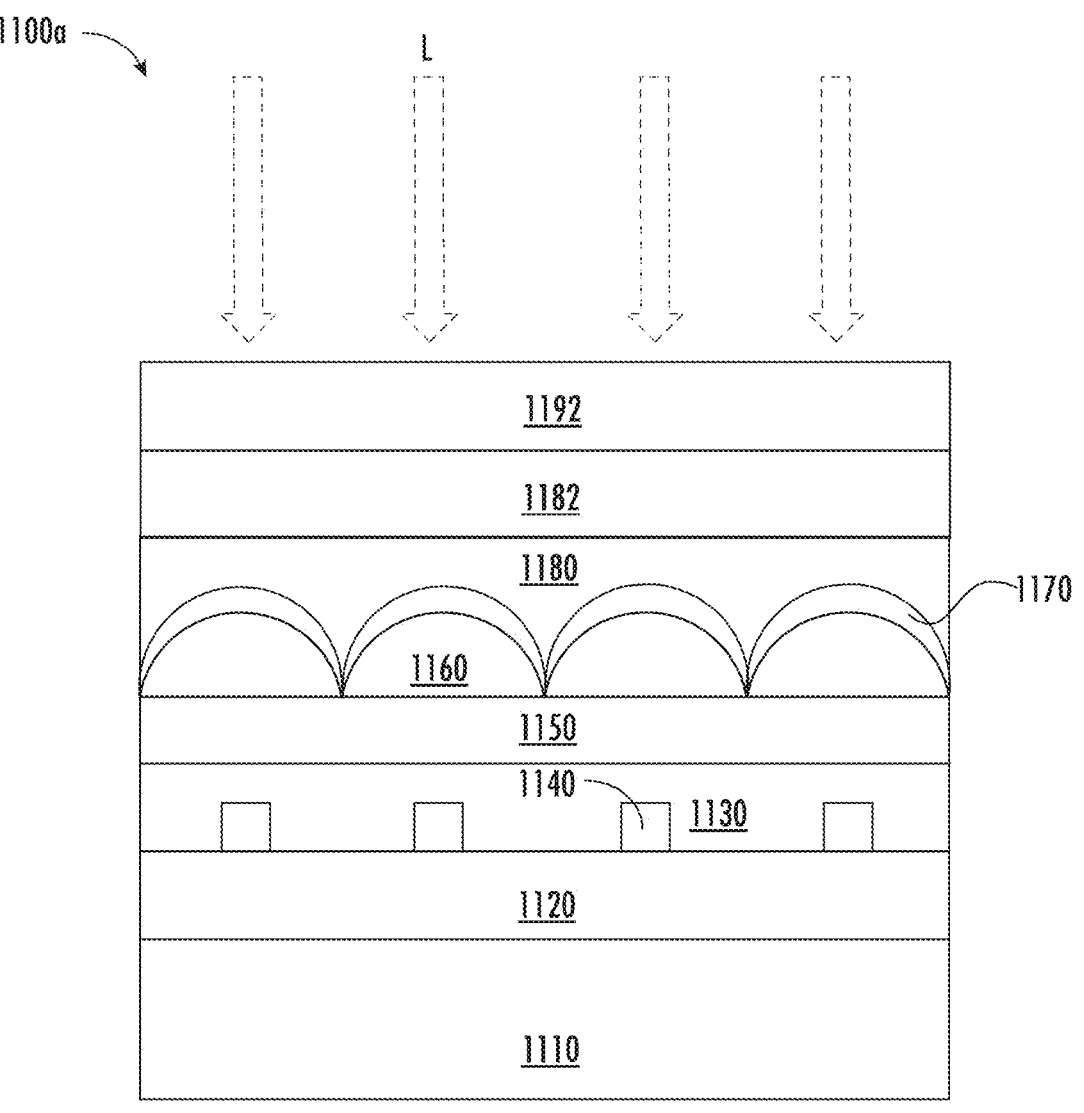
FIGS. 11A-11C illustrate cross-sectional views of an optical sensing apparatus with micro-lens, according to example aspects of the present disclosure.
Figure 11B:
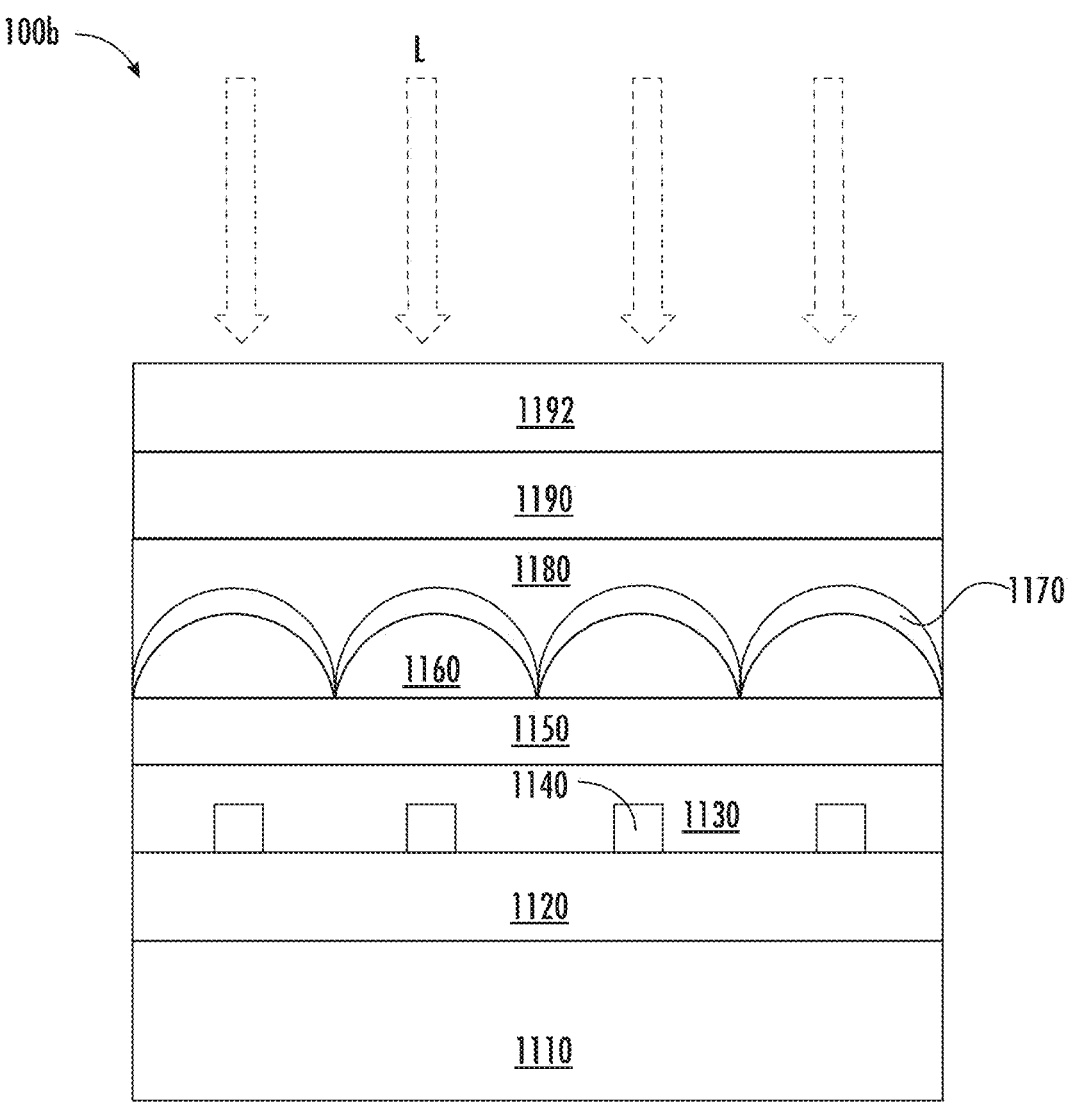
Figure 11C:
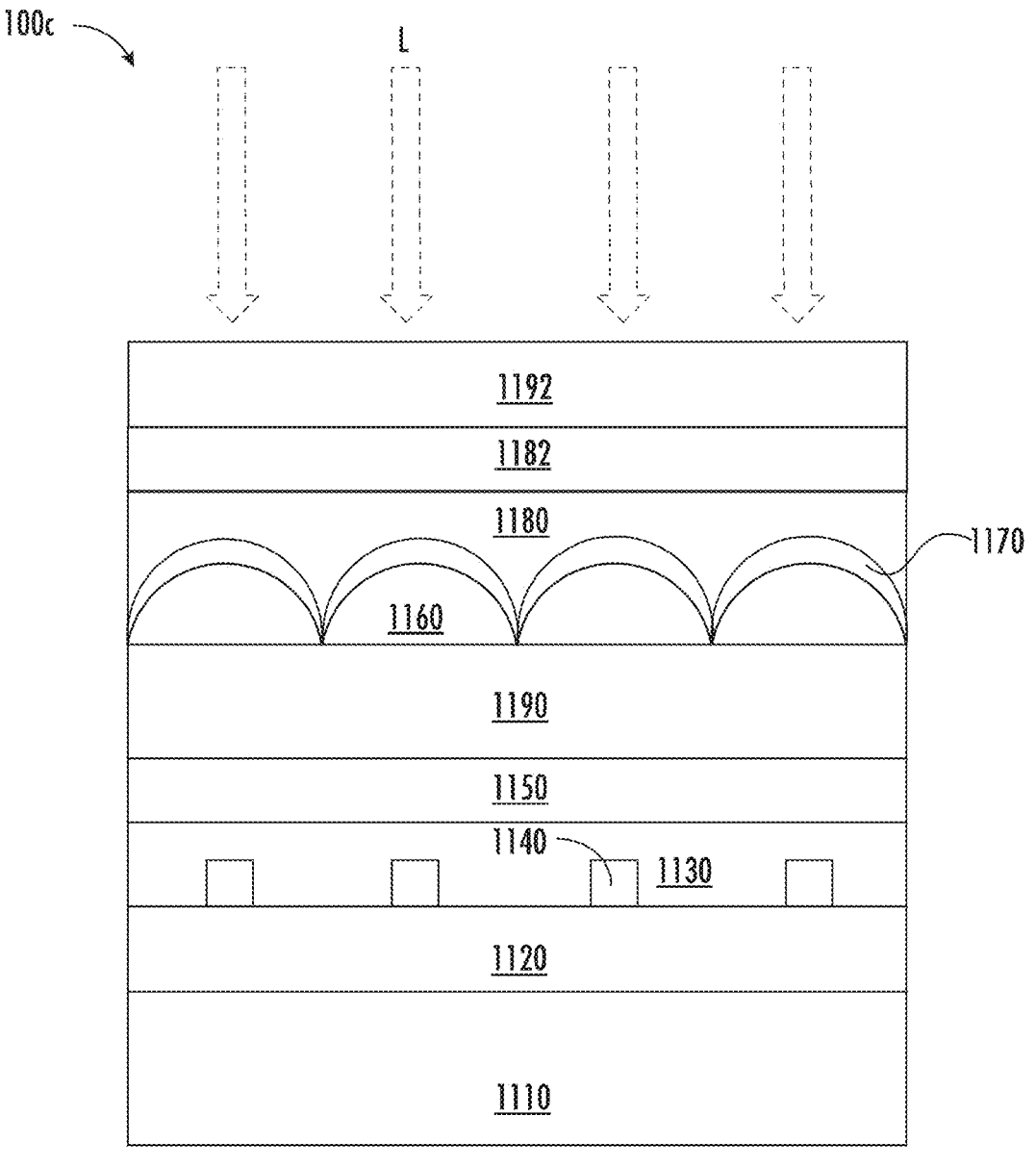

FIG. 11A-11C discloses examples of high-index microlens array assembly for photodetectors (e.g., photodetector array 102, photodetector 710). During packaging or assembling an optical sensor component (e.g., chip or module) on a system (e.g., printed circuit board), an encapsulation layer such as epoxy may be used to cover the optical component in order to protect the optical component. The optical sensor component may include a micro-lens or a micro-lens array for guiding (e.g., focusing) light onto the sensor(s). The micro-lens may be formed using a polymer-based material, which may have an effective refractive index that is close to the effective refractive index of the encapsulation layer. As the result of the lower refractive index contrast, the designed performance (e.g., focal length) of the micro-lens may suffer. Accordingly, an optical sensing apparatus 1100 (e.g.,

1100a, 1100b, 1100c) that addresses such technical issue is disclosed. The optical sensing apparatus 1100 includes a substrate 1130 (e.g., Si, or the first substrate 712 in FIG. 7); one or more pixels 1140 supported by the substrate, where each of the pixel 1140 comprises an absorption region (e.g., Ge, or the absorption region 714 in FIG. 7) supported by the substrate, the absorption region configured to receive an optical signal L and generate photo-carriers in response to receiving the optical signal.

The optical sensing apparatus 1100 further comprises one or more lenses 1160 over the respective pixel of the one or more pixels 1140, where the one or more lenses 1160 are composed of a first material (e.g., Si) having a first refractive index (e.g., ≥3 at the wavelength range absorbed by the absorption region of the one or more pixels 1140). The optical sensing apparatus 1100 further comprises an encapsulation layer 1192 over the one or more lenses and composed of a second material (e.g., polymer) having a second refractive index between 1.3 to 1.8, where a difference between the first refractive index and the second refractive index is above an index threshold such that a difference between an effective focal length of the one or more lenses 1160 and a distance between the one or more lenses 1160 and the one or more pixels 1140 is within a distance threshold (e.g., 1%, 5%, or any other threshold that is tolerable by the system). As a result, the optical signal L can be converged and focused to enter the absorption region of the one or more pixels 1140.

In some embodiments, the first refractive index of the one or more lenses 1160 is not less than 3, where the difference between the first refractive index and the second refractive index of the encapsulation layer 1192 is not less than 0.5, such that optical signal L can be converged and focused to enter the absorption region of the one or more pixels 1140.

In some embodiments, the optical sensing apparatus 1100 further comprises a first planarization layer 1180 between the encapsulation layer 1192 and the one or more lenses 1160, where the first planarization layer 1180 is composed of a third material (e.g., polymer or oxide material such as SixOy) having a third refractive index (e.g., between 1 and 2 at the wavelength range absorbed by the absorption region of the one or more pixels 1140) that is within a threshold (e.g., 1%, 5%, or any other threshold that is tolerable by the system) from the second refractive index so as to minimize reflection when the optical signal L passes through the interface between the encapsulation layer 1192 and the first planarization layer 1180. In some embodiments, the first planarization layer 1180 is configured to provide a substantially flat surface for the subsequent layer (e.g., encapsulation layer 1192, filter layer 1190 in FIG. 11B, second anti-reflection layer 1182 in FIG. 11A, or one or more lenses 1160) to be formed on.

In some embodiments, the first planarization layer 1180 or the second planarization layer 1150 is composed of a material comprising polymer having a refractive index between 1 and 2. In some embodiments, the optical sensing apparatus 1100 further comprises a second anti-reflection layer 1182 (e.g., FIGS. 1A and 1C) between the first planarization layer 1180 and the encapsulation layer 1192, where the second anti-reflection layer 1182 is composed of a sixth material (e.g., polymer or oxide material such as SixOy) having a sixth refractive index (between 1 and 2 at the wavelength range absorbed by the absorption region of the one or more pixels 1140) between the second refractive index of the encapsulation layer and the third refractive index of the first planarization layer. In some embodiments, the sixth material of the second anti-reflection layer 1182 and the third material of the first planarization layer 1180 can be the same. In some embodiments, the sixth refractive index is within a threshold (e.g., 1%, 5%, or any other threshold that is tolerable by the system) from the second refractive index so as to minimize reflection when the optical signal L passes through the interface between the encapsulation layer 1192 and the second anti-reflection layer 1182.

In some embodiments, the optical sensing apparatus 1100 further comprises a filter layer (e.g., 1190 in FIG. 11C) between the one or more lenses 1160 and the one or more pixels 1140, wherein the filter layer is configured to pass optical signal having a specific wavelength range.

In some embodiments, the optical sensing apparatus 1100 further comprises comprising a second planarization layer 1150 (e.g., in FIG. 11C) between the filter layer 1190 and the substrate 1130. In some embodiments, the optical sensing apparatus further comprises a carrier substrate 1110 (e.g., the second substrate 716 in FIG. 7) and an integrated circuit layer 1120 (e.g., the circuitry 718 in FIG. 7) between the one or more pixels 1140 and the carrier substrate 1110, wherein the integrated circuit layer 1120 comprises a control circuit configured to control the one or more pixels 1140.

In some embodiments, the substrate 1130 is composed of a material comprising silicon. In some embodiments, the absorption region is composed of a material comprising germanium. In some embodiments, the absorption regions of the one or more pixels 1140 are at least partially embedded in a substrate 1130.

In the present disclosure, if not specifically mention, the absorption region has a thickness depending on the wavelength of photons to be detected and the material of the absorption region. In some embodiments, when the absorption region includes germanium and is designed to absorb photons having a wavelength equal to or greater than 800 nm, the absorption region has a thickness equal to or greater than 0.1 μm. In some embodiments, the absorption region includes germanium and is designed to absorb photons having a wavelength between 700 nm and 2000 nm, the absorption region has a thickness between 0.1 μm and 2.5 μm. In some embodiments, the absorption region has a thickness between 1 μm and 2.5 μm for higher quantum efficiency. In some embodiments, the absorption region may be grown using a blanket epitaxy, a selective epitaxy, or other applicable techniques.

As used herein and not otherwise defined, the terms "substantially" and "about" are used to describe and account for small variations. When used in conjunction with an event or circumstance, the terms can encompass instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

FIG. 12 depicts a flowchart illustrating an example method 1200 for optical sensing according to example embodiments of the present disclosure. One or more portions of the method 1200 can be implemented by one or more devices such as, for example, any of those described herein (e.g., optical sensing apparatuses). One or more portions of the method 1200 described herein can be implemented as an algorithm on the hardware components of the devices described herein (e.g., as in FIGS. 1-6 and 8) to, for example, customize a reconfigurable sensor. Although FIG. 12 depicts steps performed in a particular order for purposes of illustration and discussion, method 1200 of FIG. 12 is not limited to the particularly illustrated order or arrangement. The various steps of the methods disclosed herein can be omitted, rearranged, combined, and/or adapted in various ways without deviating from the scope of the present disclosure.

At (1202), the method 1200 can include receiving a first optical signal by a first region of a plurality of photodetectors.

At (1204), the method 1200 can include receiving a second optical signal by a second region of the plurality of photodetectors that is separate from the first region.

At (1206), the method 1200 can include performing, by a first circuitry, a first function based on one or more of the first optical signal detected by the first region or the second optical signal detected by the second region to output a first output result. At (1208), the method 1200 can additionally or alternatively include performing, by a second circuitry, a second function based on one or more of the first optical signal detected by the first region or the second optical signal detected by the second region to output a second output result. In some instances, the first function can include a color or a grey sensing function and the second function can include a dynamic visual sensing function. In some instances, the first function can include a 3D sensing function, and the second function can include a color sensing function or a dynamic visual sensing function. In some instances, the first function can include a color sensing function or a grey sensing function, the second function can include a short-wavelength infrared (SWIR) sensing function, and the predetermined function can include a material recognition function that determines one or more characteristics of a material. In some instances, the first function can include a 3D sensing function, the second function can include a color sensing function, and the predetermined function can include a depth color fusion function that determines a colored 3D image. In some instances, the first function can include a 3D sensing function for the first optical signal with a first wavelength, the second function can include a 3D sensing function for the second optical signal with a second wavelength, and the predetermined function can include a material recognition function that determines one or more characteristics of a material.

At (1210), the method 1200 can include outputting, by an adjustment circuitry, an adjust signal to the first circuitry to adjust the first output result based on the second output result. In some instances, the adjustment circuitry can be implemented by an application specific integrated circuit (ASIC), digital signal processing (DSP) processor, general-purpose processor, or any combination thereof. In some instances, such as when one or more of the first function or the second function is a 3D sensing function, a frame rate of the 3D sensing function is adjusted based on the adjust signal.

At (1212), the method 1200 can include performing, by an output circuitry, a predetermined function and outputting an output result based on the first output result and the second output result. In some instances, the output circuitry can be implemented by an application specific integrated circuit (ASIC), digital signal processing (DSP) processor, general-purpose processor, or any combination thereof.

At (1214), the method 1200 can include emitting, by a light emitter, an optical signal, wherein the first optical signal is a portion of the optical signal reflected by a target object.

At (1216), the method can include passing, by a wavelength filter, light within a predetermined wavelength range to the first region.

At (1218), the method can include separating, by an isolation structure, the first region and the second region.

Figure 13:
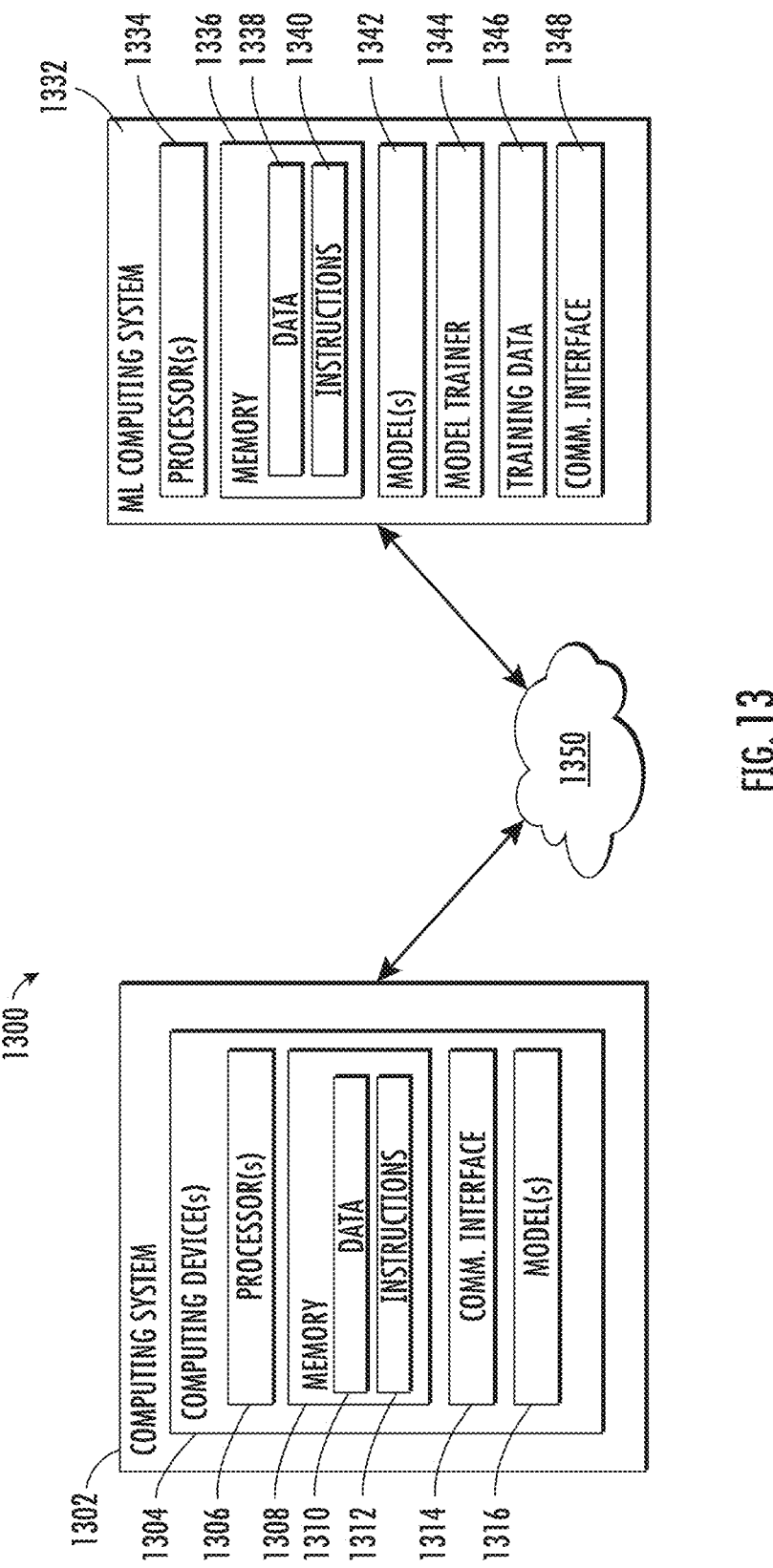
FIG. 13 depicts example computing system components and devices according to example aspects of the present disclosure.

FIG. 13 depicts a block diagram of an example computing system 1300 according to example embodiments of the present disclosure. The example system 1300 includes a computing system 1302 and a machine learning computing system 1332 that are communicatively coupled over a network 1350.

In some implementations, the computing system 1302 can perform the operations and functions of the various computing devices described herein. For example, the computing system 1302 can represent an optical sensing apparatus, the various components of an optical sensing apparatus, and/or other elements described herein and can perform the functions of such elements. The computing system 1302 can include one or more distinct physical computing devices.

The computing system 1302 can include one or more computing devices 1304. The one or more computing devices 1304 can include one or more processors 1306 and a memory 1308. The one or more processors 1306 can be any suitable processing device (e.g., a processor core, a microprocessor, an ASIC, a FPGA, a controller, a microcontroller, etc.) and can be one processor or a plurality of processors that are operatively connected. The memory 1308 can include one or more non-transitory computer-readable storage media, such as RAM, ROM, EEPROM, EPROM, one or more memory devices, flash memory devices, etc., and combinations thereof.

The memory 1308 can store information that can be accessed by the one or more processors 1306. For instance, the memory 1308 (e.g., one or more non-transitory computer-readable storage mediums, memory devices) can store data 1310 that can be obtained, received, accessed, written, manipulated, created, and/or stored. The data 1310 can include, for instance, data indicative of: one or more electrical signals, optical currents, interference signals, targets, non-targets, regions of interest, photodetectors, calibrated signals, inputs/output, and/or any other data and/or information as described herein. In some implementations, the computing system 1302 can obtain data from one or more memory device(s) that are remote from the system 1302.

The memory 1308 can also store computer-readable instructions 1312 that can be executed by the one or more processors 1306. The instructions 1312 can be software written in any suitable programming language or can be implemented in hardware. Additionally, or alternatively, the instructions 1312 can be executed in logically and/or virtually separate threads on processor(s) 1306.

For example, the memory 1308 can store instructions 1312 that when executed by the one or more processors 1306 cause the one or more processors 1306 to perform any of the operations and/or functions described herein, including, for example, the operations and functions of any of the systems/apparatuses described herein, one or more portions of the methods/processes described herein, and/or any other functions or operations.

According to an aspect of the present disclosure, the computing system 1302 can store or include one or more machine-learned models 1316. As examples, the machine-learned models 1316 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1302 can receive the one or more machine-learned models 1316 from the machine learning computing system 1332 over network 1350 and can store the one or more machine-learned models 1316 in the memory 1308. The computing system 1302 can then use or otherwise implement the one or more machine-learned models 1316 (e.g., by processor(s) 1306). In particular, the computing system 1302 can implement the machine-learned model(s) 1316 for a proximity sensing application, a gesture recognition application, a three-dimensional imaging application, statically or dynamically determining regions of interests, or any other suitable sensing applications. In some implementations, the input to the machine-learned model(s) 1316 can be a fused input based on signals from multiple sources.

The machine learning computing system 1332 includes one or more processors 1334 and a memory 1336. The one or more processors 1334 can be any suitable processing device (e.g., a processor core, a microprocessor, an ASIC, a FPGA, a controller, a microcontroller, etc.) and can be one processor or a plurality of processors that are operatively connected. The memory 1336 can include one or more non-transitory computer-readable storage media, such as RAM, ROM, EEPROM, EPROM, one or more memory devices, flash memory devices, etc., and combinations thereof.

The memory 1336 can store information that can be accessed by the one or more processors 1334. For instance, the memory 1336 (e.g., one or more non-transitory computer-readable storage mediums, memory devices) can store data 1338 that can be obtained, received, accessed, written, manipulated, created, and/or stored. The data 1338 can include, for instance, any of the data and/or information as described herein. In some implementations, the machine learning computing system 1332 can obtain data from one or more memory device(s) that are remote from the machine learning computing system 1332.

The memory 1336 can also store computer-readable instructions 1340 that can be executed by the one or more processors 1334. The instructions 1340 can be software written in any suitable programming language or can be implemented in hardware. Additionally, or alternatively, the instructions 1340 can be executed in logically and/or virtually separate threads on processor(s) 1334.

For example, the memory 1336 can store instructions 1340 that when executed by the one or more processors 1334 cause the one or more processors 1334 to perform any of the operations and/or functions described herein, including, for example, the operations and functions of any of the systems/apparatuses described herein, one or more portions of the methods/processes described herein, and/or any other functions or processes.

In some implementations, the machine learning computing system 1332 includes one or more server computing devices. If the machine learning computing system 1332 includes multiple server computing devices, such server computing devices can operate according to various computing architectures, including, for example, sequential computing architectures, parallel computing architectures, or some combination thereof.

Additionally, or alternatively, to the machine-learned model(s) 1316 at the computing system 1302, the machine learning computing system 1332 can include one or more machine-learned models 1342. As examples, the machine-learned models 1342 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1332 can communicate with the computing system 1302 according to a client-server relationship. For example, the machine learning computing system 1332 can implement the machine-learned models 1342 to provide a web service to the computing system 1302. For example, the web service can provide the functions and operations of the optical sensing described herein.

Thus, machine-learned models 1316 can be located and used at the computing system 1302 and/or machine-learned models 1342 can be located and used at the machine learning computing system 1332.

In some implementations, the machine learning computing system 1332 and/or the computing system 1302 can train the machine-learned models 1316 and/or 1342 through use of a model trainer 1344. The model trainer 1344 can train the machine-learned models 1316 and/or 1342 using one or more training or learning algorithms. One example training technique is backwards propagation of errors. In some implementations, the model trainer 1344 can perform supervised training techniques using a set of labeled training data. In other implementations, the model trainer 1344 can perform unsupervised training techniques using a set of unlabeled training data. The model trainer 1344 can perform a number of generalization techniques to improve the generalization capability of the models being trained. Generalization techniques include weight decays, dropouts, or other techniques.

In particular, the model trainer 1344 can train a machine-learned model 1316 and/or 1344 based on a set of training data 1346. The training data 1346 can include, for example, labelled input data and/or fused data indicative of electrical signals, wavelengths, etc. The model trainer 1344 can be implemented in hardware, firmware, and/or software controlling one or more processors.

The computing system 1302 can also include a communication interface 1314 used to communicate with one or more systems or devices, including systems or devices that are remotely located from the computing system 1302. The communication interface 1314 can include any circuits, components, software, etc. for communicating with one or more networks 1350. In some implementations, the communication interface 1314 can include, for example, one or more of a communications controller, receiver, transceiver, transmitter, port, conductors, software and/or hardware for communicating data. Similarly, the machine learning computing system 1332 can include a communication interface 1348.

The network(s) 1350 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) can be accomplished, for instance, via a network interface using any type of protocol, protection scheme, encoding, format, packaging, etc.

FIG. 13 illustrates one example computing system 1300 that can be used to implement the present disclosure. Other computing systems can be used as well. For example, in some implementations, the computing system 1302 can include the model trainer 1344 and the set of training data 1346. In such implementations, the machine-learned models 1316 can be both trained and used locally at the computing system 1302. As another example, in some implementations, the computing system 1302 is not connected to other computing systems.

In addition, components illustrated and/or discussed as being included in one of the computing systems 1302 or 1332 can instead be included in another of the computing systems 1302 or 1332. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Various means can be configured to perform the methods, operations, and processes described herein. For example, any of the systems and apparatuses (e.g., optical sensing apparatus and related circuitry) can include unit(s) and/or other means for performing their operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data register(s), database(s), and/or other suitable hardware.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical sensing apparatus, comprising:
   a light emitter configured to emit an optical signal to a target object;
   a first die comprising a photodetector, wherein the photodetector is configured to detect a first optical signal with a first wavelength and a second optical signal with a second wavelength which is different from the first wavelength, wherein the photodetector comprises a same region for detecting the first optical signal and the second optical signal at different times, wherein the first optical signal is a first portion of the optical signal reflected by the target object, wherein the second optical signal is a second portion of the optical signal reflected by the target object, wherein the first optical signal is detected by the photodetector at a first time, and wherein the second optical signal is detected by the photodetector at a second time that is different from the first time; and
   a processing circuitry configured to receive a first output result associated with the first optical signal and a second output result associated with the second optical signal, and perform a predetermined function based on the first output result and the second output result, wherein the predetermined function comprises recognizing a material type of the target object.

2. The optical sensing apparatus of claim 1, further comprising a circuitry coupled to the photodetector, the circuitry configured to output the first output result associated with the first optical signal and to output the second output result associated with the second optical signal.

3. The optical sensing apparatus of claim 2, wherein the circuitry outputs the first output result and outputs the second output result at different times.

4. The optical sensing apparatus of claim 2, wherein the circuitry is formed on a second die, and the first die is bonded to the second die to form a single chip.

5. The optical sensing apparatus of claim 1, wherein the second wavelength is within short-wavelength infrared (SWIR) wavelength range.

6. The optical sensing apparatus of claim 1, wherein recognizing the material type of the target object further comprises determining a difference between the first output result and the second output result.

7. The optical sensing apparatus of claim 1, further comprising a driver configured to generate a driving signal to the light emitter to generate the optical signal.

8. The optical sensing apparatus of claim 1, wherein the light emitter comprises multiple light sources each configured to emit a different signal with a different wavelength.

9. The optical sensing apparatus of claim 1, wherein the photodetector comprises a light-absorption material including germanium, and the light-absorption material is formed on a silicon substrate.

10. The optical sensing apparatus of claim 1, further comprising a first wavelength filter arranged to pass light having the first wavelength.

11. The optical sensing apparatus of claim 1, further comprising a microlens formed on the photodetector.

12. An optical sensing apparatus, comprising:
   a substrate;
   a light emitter arranged on the substrate and configured to emit an optical signal to a target object; and
   a chip arranged on the substrate and comprising:
      a first die comprising a photodetector, wherein the photodetector is configured to detect a first optical signal with a first wavelength and a second optical signal with a second wavelength which is different from the first wavelength, wherein the first optical signal is a first portion of the optical signal reflected by the target object and the second optical signal is a second portion of the optical signal reflected by the target object, and wherein the photodetector comprises a same region for detecting the first optical signal and the second optical signal at different times; and a second die bonded to the first die, the second die comprising circuitry configured to perform a predetermined function based on the first optical signal and the second optical signal;

wherein the predetermined function comprises recognizing a material type of the target object.

13. The optical sensing apparatus of claim 12, wherein the circuitry is configured to output a first output result associated with the first optical signal and to output a second output result associated with the second optical signal, and wherein performing the predetermined function further comprises performing the predetermined function based on the first output result and the second output result.

14. The optical sensing apparatus of claim 13, wherein the circuitry outputs the first output result and outputs the second output result at a different time.

15. The optical sensing apparatus of claim 13, wherein recognizing the material type of the target object further comprises determining a difference between the first output result and the second output result.

16. The optical sensing apparatus of claim 12, wherein the photodetector comprises a light-absorption material including germanium, and the light-absorption material is formed on a silicon substrate.

17. The optical sensing apparatus of claim 12, wherein the second wavelength is within short-wavelength infrared (SWIR) wavelength range.

18. The optical sensing apparatus of claim 12, further comprising a first wavelength filter arranged to pass light having the first wavelength.

19. The optical sensing apparatus of claim 12, further comprising a microlens formed on the photodetector.

20. The optical sensing apparatus of claim 12, wherein the light emitter comprises multiple light sources each configured to emit a different signal with a different wavelength.

* * * * *